(12) United States Patent
Sato et al.

(10) Patent No.: US 11,172,129 B2
(45) Date of Patent: Nov. 9, 2021

(54) IMAGE BLURRING CORRECTION APPARATUS, IMAGE BLURRING CORRECTION METHOD, AND RECORDING MEDIUM HAVING IMAGE BLURRING CORRECTION PROGRAM RECORDED THEREIN

(71) Applicant: OLYMPUS CORPORATION, Hachioji (JP)

(72) Inventors: Tomoyuki Sato, Tokyo (JP); Shuichi Adachi, Yokohama (JP); Tasuku Takagi, Hino (JP)

(73) Assignee: OLYMPUS CORPORATION, Tokyo (JP)

( * ) Notice: Subject to any disclaimer, the term of this patent is extended or adjusted under 35 U.S.C. 154(b) by 0 days.

(21) Appl. No.: 16/875,255

(22) Filed: May 15, 2020

(65) Prior Publication Data

US 2020/0374458 A1 Nov. 26, 2020

(30) Foreign Application Priority Data

May 23, 2019 (JP) .............................. JP2019-097084

(51) Int. Cl.
*H04N 5/232* (2006.01)
*G06T 5/00* (2006.01)
*G06T 7/20* (2017.01)
*G06T 7/277* (2017.01)

(52) U.S. Cl.
CPC ..... *H04N 5/23258* (2013.01); *H04N 5/23267* (2013.01); *H04N 5/23287* (2013.01)

(58) Field of Classification Search
CPC ........... H04N 5/23258; H04N 5/23267; H04N 5/23287; H04N 5/23248; H04N 5/23264; H04N 5/2328; G06T 7/277; G06T 5/003; G06T 2207/20201; G06T 7/20; G03B 21/13; G03B 2205/0007
USPC .......... 348/208.2, 208.11, 222.1, 224.1, 290, 348/360, 208.99; 382/255, 264
See application file for complete search history.

(56) References Cited

U.S. PATENT DOCUMENTS

| 5,649,237 A | 7/1997 | Okazaki | |
|---|---|---|---|
| 2013/0162847 A1* | 6/2013 | Miyazawa | ............. H04N 5/232 348/208.1 |
| 2015/0036007 A1* | 2/2015 | Wakamatsu | ....... H04N 5/23258 396/55 |

FOREIGN PATENT DOCUMENTS

| JP | H07-225405 A | 8/1995 |
|---|---|---|
| JP | 2013-130720 A | 7/2013 |

* cited by examiner

*Primary Examiner* — Marly S Camargo
(74) *Attorney, Agent, or Firm* — Volpe Koenig

(57) ABSTRACT

An image blurring correction apparatus includes: an optical system that forms a subject image on an image formation plane; an acceleration sensor that detects an acceleration of an apparatus that has the image formation plane; a first calculation circuit that calculates a first state quantity by using the acceleration; a second calculation circuit that calculates, as a second state quantity, an estimate value obtained by estimating a true value of the first state quantity by using the first state quantity and a model; and a third calculation circuit that calculates an amount of image blurring on the image formation plane by using the second state quantity.

12 Claims, 20 Drawing Sheets

IMAGE BLURRING CORRECTION APPARATUS, IMAGE BLURRING CORRECTION METHOD, AND RECORDING MEDIUM HAVING IMAGE BLURRING CORRECTION PROGRAM RECORDED THEREIN

CROSS-REFERENCE TO RELATED APPLICATION

This application is based upon and claims the benefit of priority of the prior Japanese Patent Application No. 2019-097084, filed on May 23, 2019, the entire contents of which are incorporated herein by reference.

FIELD

Embodiments are related to an image blurring correction apparatus and an image blurring correction method for correcting image blurring resulting from translation of an image capturing apparatus and a recording medium having an image blurring correction program recorded therein.

BACKGROUND

With the development of shake correction functions of image capturing apparatuses such as digital cameras in recent years, image blurring (also referred to as "angular blurring") caused by a rotational motion of the image capturing apparatus can be corrected with high accuracy.

In the meantime, camera shaking in macro shooting is largely affected by image blurring (also referred to as "translational blurring", "parallel blurring", or "shift blurring") caused by a translational motion of the image capturing apparatus, and hence correcting only angular blurring could be insufficient and result in image degradation.

Accordingly, a correction apparatus has been proposed that includes a sensor for detecting the acceleration of a translational motion of an image capturing apparatus and a sensor for detecting the angular velocity of a rotational motion of the image capturing apparatus, wherein the amount of translational blurring is calculated from the detected acceleration or both the detected acceleration and angular velocity so as to correct image blurring. Such an apparatus is described in, for example, Japanese Laid-open Patent Publication No. 7-225405.

SUMMARY

In an aspect of embodiments, an image blurring correction apparatus includes: an optical system that forms a subject image on an image formation plane; an acceleration sensor that detects an acceleration of an apparatus that has the image formation plane; a first calculation circuit that calculates a first state quantity by using the acceleration; a second calculation circuit that calculates, as a second state quantity, an estimate value obtained by estimating a true value of the first state quantity by using the first state quantity and a model; a third calculation circuit that calculates an amount of image blurring on the image formation plane by using the second state quantity; and a memory that records the model.

In another aspect of embodiments, an image blurring correction method includes: forming a subject image on an image formation plane; detecting an acceleration of an apparatus that has the image formation plane; calculating a first state quantity by using the acceleration; calculating, as a second state quantity, an estimate value obtained by estimating a true value of the first state quantity by using the first state quantity and a model; and calculating an amount of image blurring on the image formation plane by using the second state quantity.

In another aspect of embodiments, a non-transitory recording medium has recorded therein an image blurring correction program to be executed by a computer, the image blurring correction program causing the computer to perform a process including: forming a subject image on an image formation plane; detecting an acceleration of an apparatus that has the image formation plane; calculating a first state quantity by using the acceleration; calculating, as a second state quantity, an estimate value obtained by estimating a true value of the first state quantity by using the first state quantity and a model; and calculating an amount of image blurring on the image formation plane by using the second state quantity.

DESCRIPTION OF EMBODIMENTS

Figure 1:
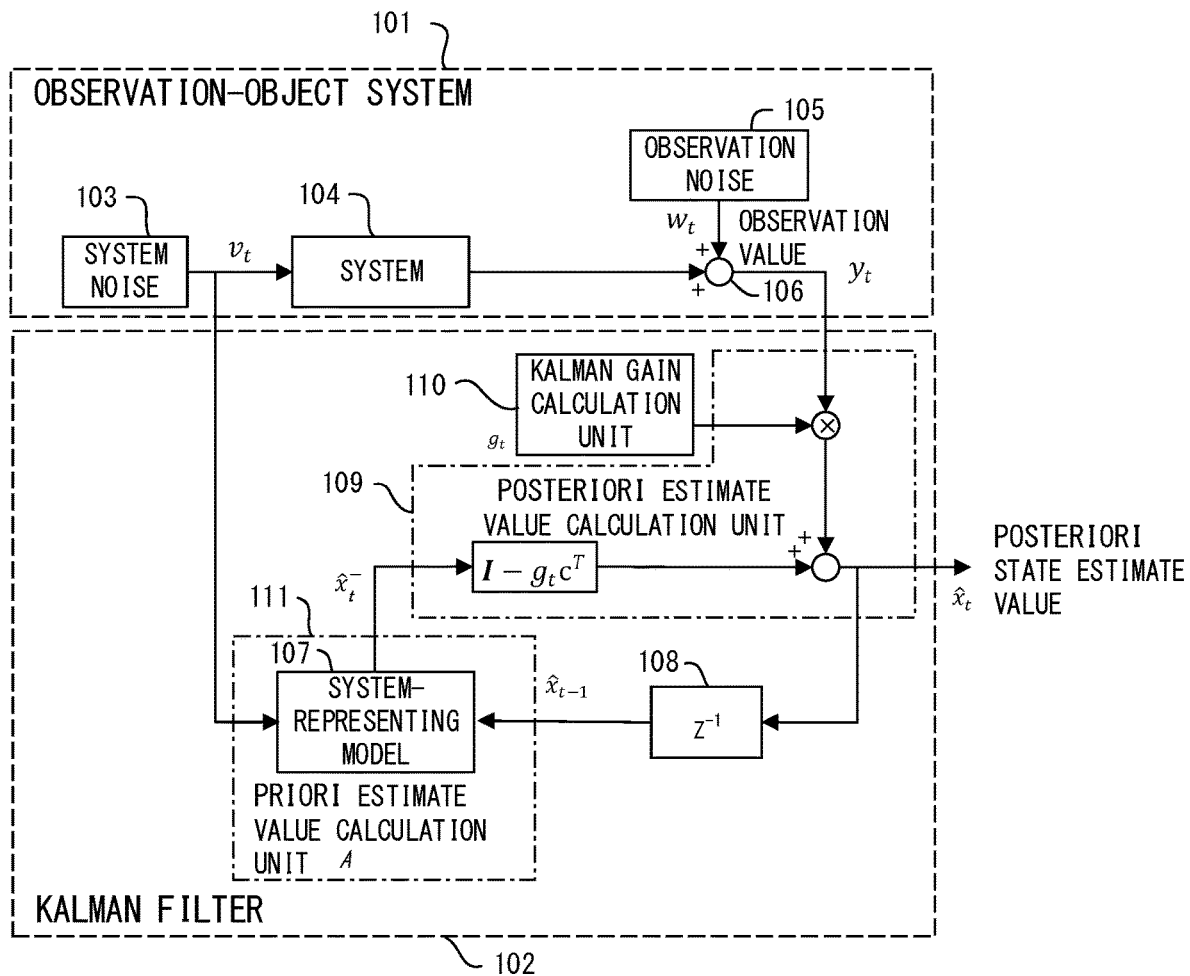
FIG. 1 illustrates an example of a system that includes a Kalman filter.

The following describes embodiments by referring to the drawings.

A correction apparatus described in, for example, Japanese Laid-open Patent Publication No. 7-225405 is such that errors pertaining to sensors, such as temperature drift, gravity variation, and erroneous offset, are added up in the process of determining the amount of translational movement by performing integration twice. Hence, the errors will increase with time after detection of sensor output. Thus, a bandpass filter is used for the sensor output for error removal. However, as the frequency band of the sensor errors (1 Hz or lower) is close to the frequency band of camera shaking (1 to 10 Hz), characteristic losses resulting from a gain reduction or phase fluctuation in detected camera shaking components, i.e., characteristic losses caused by the bandpass filter, cannot be avoided. Accordingly, an accurate shake correction cannot be made.

In view of the situations described above, the embodiments described in the following, which were created by focusing on characteristic losses of camera shaking components that result from a filtering process, are intended to provide a technique for increasing a shake correction performance by achieving a filtering process with fewer characteristic losses than the conventional filters by modeling a person's translational camera shaking characteristics and using model-based estimate values.

First, descriptions are given of principles of a filtering process (estimation filtering process) described herein with reference to embodiments. A simple mathematical formula expressing a behavior of a given system or time-series signal will hereinafter be referred to as a model.

A current state can be estimated from a past state by using the model.

In one method, the estimated current state value and the current observation value are compared to calculate an error for each of these values, so that the current state can be estimated with higher accuracy and a value that cannot be directly observed can be estimated.

The following describes a Kalman filter as a specific example of a filter (estimation filter).

The Kalman filter is a type of Bayesian filter for estimating or controlling the state of a certain dynamic system by using an observation value having an error and a model representing a system.

FIG. 1 illustrates an example of a system that includes a Kalman filter.

The system depicted in FIG. 1 includes an observation-object system 101 and a Kalman filter 102.

A given system 104 in the observation-object system 101 depicted in FIG. 1 is driven by a system noise $v_t$103. An adder 106 outputs an observation value $y_t$ obtained by adding a portion of the state of the system 104 and an observed noise $w_t$105.

The Kalman filter 102 is such that a model 107 representing the system 104 outputs a priori state estimate value $\hat{x}^-_t$ for time t on the basis of the system noise $v_t$103 and a posteriori state estimate value $\hat{x}_{t-1}$ obtained for a preceding time (time t−1) by a delay operator $Z^-$108. A posteriori estimate value calculation unit 109 corrects the priori state estimate value $\hat{x}^-_t$ for time t by using a current observation value $y_t$ and a Kalman gain $g_t$ calculated on the basis of a model error and an observation error by a Kalman gain calculation unit 110 and outputs the posteriori state estimate value $\hat{x}_t$.

Figure 2:
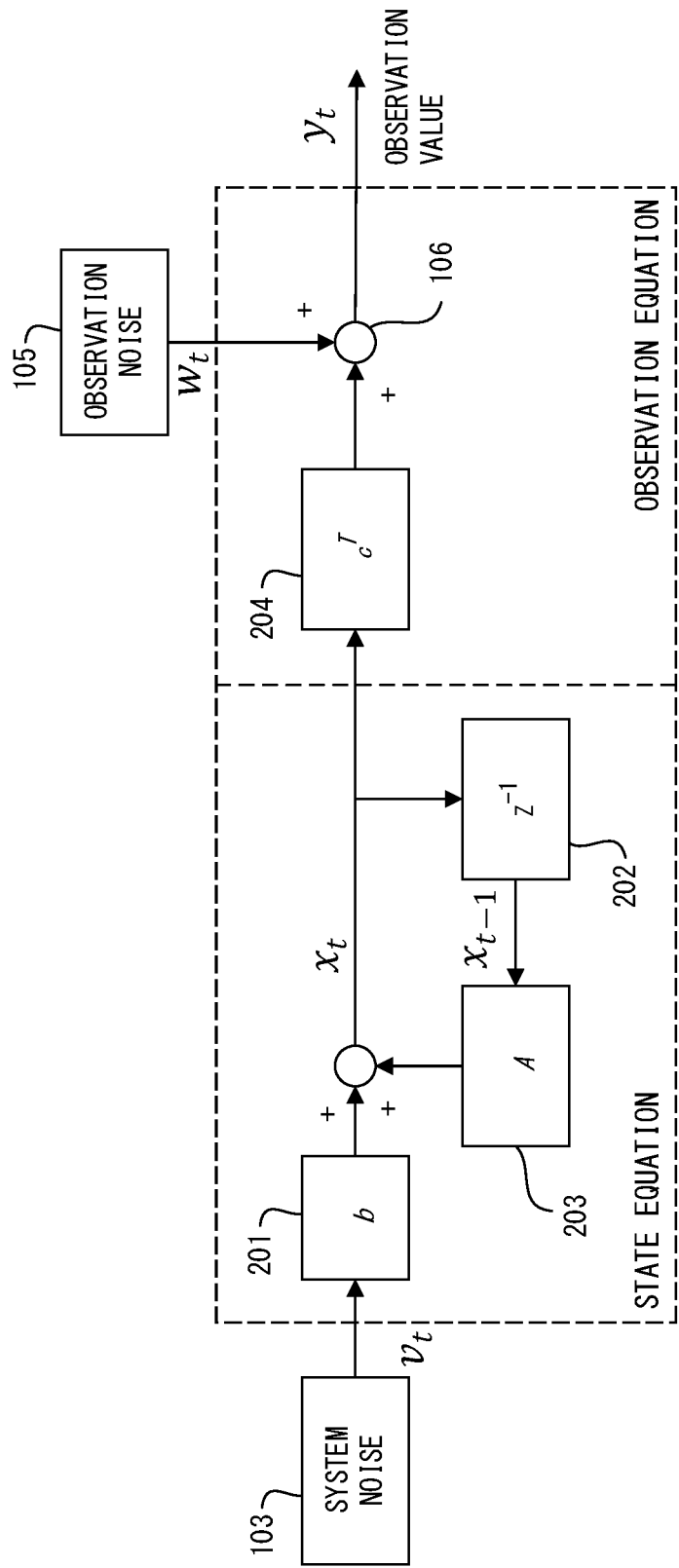
FIG. 2 is a block diagram representing an observation-object system depicted in FIG. 1 by using a state space model based on a relationship between an observation equation and a state equation.

FIG. 2 is a block diagram representing the observation-object system 101 depicted in FIG. 1 by using a state space model based on a relationship between an observation equation and a state equation. Note that the Kalman filter can be used when the observation-object system 101 can be represented by a state space model. The state space model is expressed by the following two formulae, a state equation (formula (1)) and an observation equation (formula (2)).

State equation: $x_t = A x_{t-1} + b v_t$  Formula (1)

Observation equation: $y_t = c^T x_t + w_t$  Formula (2)

The left side of the state equation (formula (1)) indicates a state $x_t$ of the system 104 at time t, and the right side thereof indicates the sum of the product (first term) of a state transition matrix A203 and a state $x_{t-1}$ obtained for a preceding time (time t−1) by the delay operator $Z^{-1}$202 from the state $x_t$ and the product (second term) of the system noise $v_t$103 and a driving source vector b201. The state transition matrix A203 is a coefficient indicating state transition from the state at the preceding time (time t−1) to the state at the current time (time t). The driving source vector b201 is a coefficient indicating the influence of the system noise on the state.

The left side of the observation equation (formula (2)) indicates an observation value $y_t$ for time t, and the right side thereof indicates the sum of the observation noise $w_t$105 (second term) and the product (first term) of the state $x_t$ and an observation coefficient $c^T$204. The observation coefficient $c^T$204 is a coefficient for converting a state into an observation value.

When the system noise $v_t$103 and the observation noise $w_t$105 in the state equation (formula (1)) and the observation equation (formula (2)) are white noises having normality (average is 0), the state $x_t$ to be determined can be optimally estimated using the Kalman filter 102.

Figure 3:
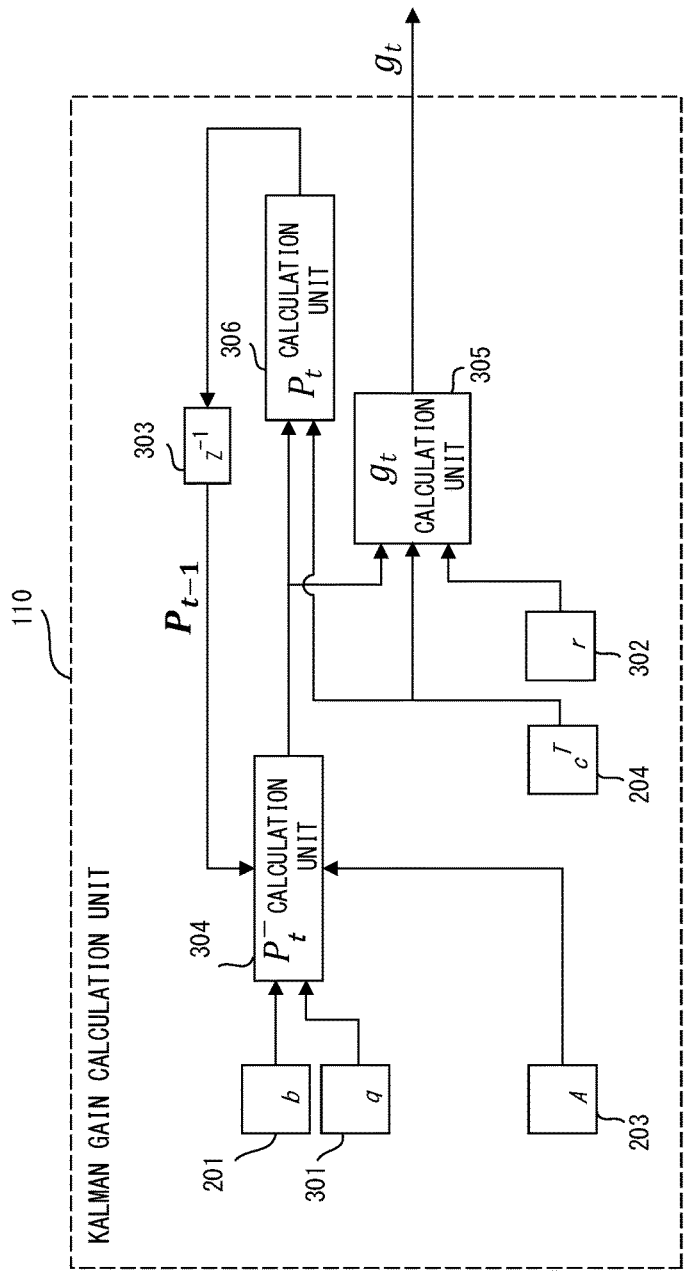
FIG. 3 is a block diagram representing the functional configuration of a Kalman gain calculation unit depicted in FIG. 1.

The following describes a process of calculating a state estimate value $\hat{x}_t$ to be determined by the Kalman filter 102 in detail by referring to FIGS. 1, 2, and 3.

The formulae (3) and (6) below correspond to FIG. 1. The formulae (4), (5), and (7) below correspond to FIG. 3.

FIG. 3 is a block diagram representing the functional configuration of the Kalman gain calculation unit 110.

In FIG. 3, coefficients A, b, and $c^T$ correspond to, and are assigned the same reference marks as, the state transition matrix A203, driving source vector b201, and observation coefficient $c^T$204 depicted in FIG. 2. q301 is a variance of the system noise $v_t$103, and r302 is a variance of the observation noise $w_t$105.

The priori state estimate value $\hat{x}^-_t$ corresponds to output of a priori estimate value calculation unit 111 depicted in FIG. 1. The posteriori state estimate value $\hat{x}_t$ is turned into a state estimate value $\hat{x}_{t-1}$ for a preceding time (time t−1) by the delay operator $Z^{-1}$108, and the priori state estimate value $\hat{x}^-_t$ is determined using the model 107. This corresponds to the product of the state transition matrix A203 and the state estimate value $\hat{x}_{t-1}$ for the preceding time (time t−1) depicted in FIG. 2 and is expressed as the following formula (3).

$\hat{x}^-_t = A \hat{x}_{t-1}$  Formula (3)

A priori error covariance matrix $P^-_t$ indicating a prediction error for the current estimate value is calculated, as described in the following, within the Kalman gain calculation unit 110 depicted in FIG. 1, in particular calculated by a $P^-_t$ calculation unit 304 depicted in FIG. 3.

An error covariance matrix $P_t$ calculated by a $P_t$ calculation unit 306 is turned by a delay operator $Z^{-1}$ 303 into $P_{t-1}$ indicating a prediction error for the preceding time (time t−1). The priori error covariance matrix $P^-_t$ is calculated using the following formula (4) from $P_{t-1}$, the variance q301 of the system noise $v_t$103, the state transition matrix A203, and the driving source vector $b$201.

$$P^-_t = AP_{t-1}A^T + qbb^T \qquad \text{Formula (4)}$$

where $A^T$ is a matrix that is a transpose of A, and $b^T$ is a matrix that is a transpose of b.

A Kalman gain $g_t$ that is a coefficient for correcting the priori state estimate value $\hat{x}^-_t$ by using the observation value $y_t$ is calculated within the Kalman gain calculation unit 110 depicted in FIG. 1. More specifically, the Kalman gain $g_t$ is calculated by a $g_t$ calculation unit 305 depicted in FIG. 3, as described in the following.

The Kalman gain $g_t$ is calculated using the following formula (5) from the priori error covariance matrix $P^-_t$ calculated by the $P^-_t$ calculation unit 304, the observation noise variance r302, and the observation coefficient $c^T$204.

$$g_t = P^-_t c \{c^T P^-_t c + r\}^{-1} \qquad \text{Formula (5)}$$

where c is a matrix that is a transpose of $c^T$.

The posteriori state estimate value $\hat{x}_t$ that is to be output by the Kalman filter 102 is calculated by the posteriori estimate value calculation unit 109 depicted in FIG. 1 correcting the priori state estimate value $\hat{x}^-_t$ by using the Kalman gain $g_t$, the observation value $y_t$, and the observation coefficient $c^T$. In particular, the posteriori state estimate value $\hat{x}_t$ is determined in accordance with the following formula (6).

$$\hat{x}_t = g_t y_t + (I - g_t c^T)\hat{x}^-_t \qquad \text{Formula (6)}$$

where I is a unit matrix.

The posteriori state estimate value $\hat{x}_t$ estimated in this way is an optimum state estimate value.

A posteriori error covariance matrix $P_t$ to be used in a next cycle is calculated within the Kalman gain calculation unit 110 depicted in FIG. 1, in particular calculated by the $P_t$ calculation unit 306 depicted in FIG. 3, as described in the following.

The posteriori error covariance matrix $P_t$ to be used in a next cycle is calculated using the following formula (7) from a priori error covariance matrix $P^-_t$ calculated by the $P^-_t$ calculation unit 304, the Kalman gain $g_t$, and the observation coefficient $c^T$204.

$$P_t = \{I - g_t c^T\} P^-_t \qquad \text{Formula (7)}$$

where I is a unit matrix.

Descriptions are given in the following to define directions for a camera that is an image capturing apparatus that includes an image blurring correction apparatus in accordance with embodiments.

Figure 4:
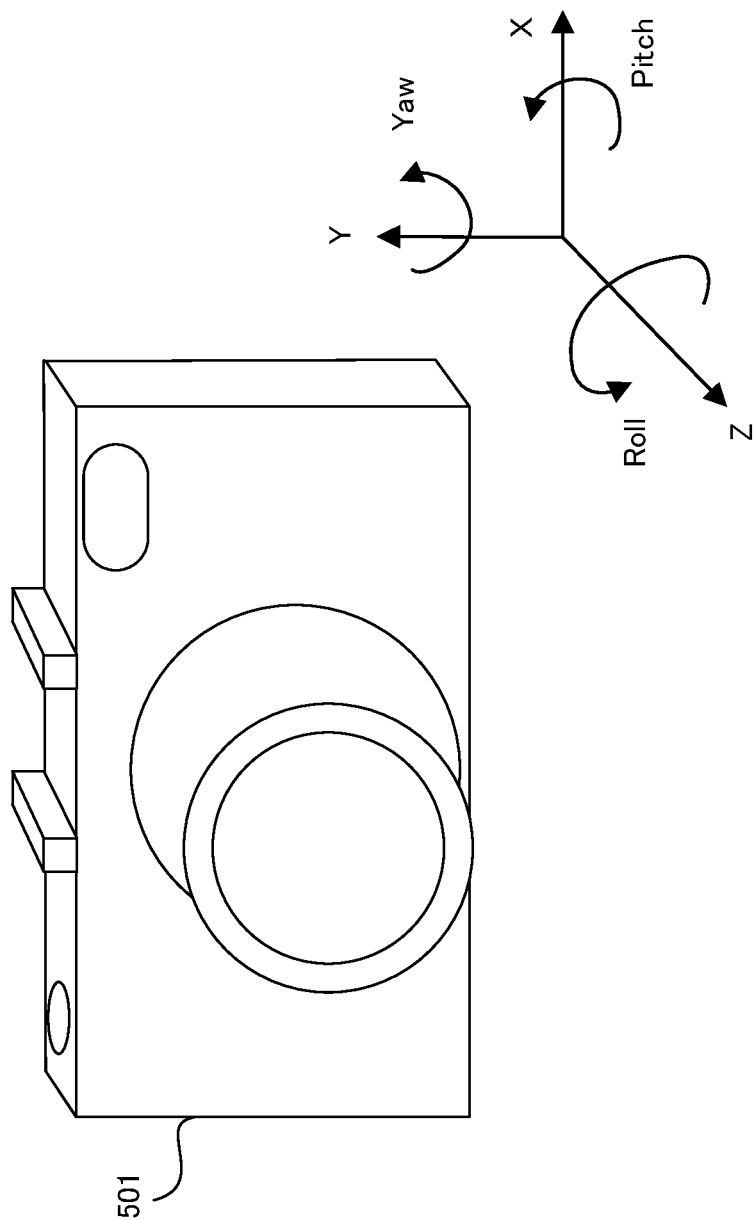
FIG. 4 illustrates directions defined for a camera that is an image capturing apparatus that includes an image blurring correction apparatus in accordance with embodiments.

FIG. 4 illustrates directions defined for a camera that is an image capturing apparatus that includes an image blurring correction apparatus in accordance with embodiments.

As depicted in FIG. 4, a X direction, a Y direction, a Z direction, a Pitch direction, a Yaw direction, and a Roll direction are defined as follows for a camera 501 that is an image capturing apparatus that includes an image blurring correction apparatus in accordance with embodiments.

Let the X direction be a left-right direction with reference to the camera 501, the Y direction be an up-down direction with reference to the camera 501, and the Z direction be a front-rear direction with reference to the camera 501.

Let the Pitch direction be a direction of rotation on an axis in the X direction (rotation on X axis), the Yaw direction be a direction of rotation on an axis in the Y direction (rotation on Y axis), and the Roll direction be a direction of rotation on an axis in the Z direction (rotation on Z axis).

According to these definitions, angular blurring consists of image blurring caused by image shifting in the X direction on an imaging plane of the camera 501 due to rotation of the camera 501 in the Yaw direction and image blurring caused by image shifting in the Y direction on the imaging plane of the camera 501 due to rotation of the camera 501 in the Pitch direction.

Translational blurring consists of image blurring caused by image shifting in the X direction on the imaging plane of the camera 501 due to translation of the camera 501 in the X direction and image blurring caused by image shifting in the Y direction on the imaging plane of the camera 501 due to translation of the camera 501 in the Y direction.

First Embodiment

Figure 5:
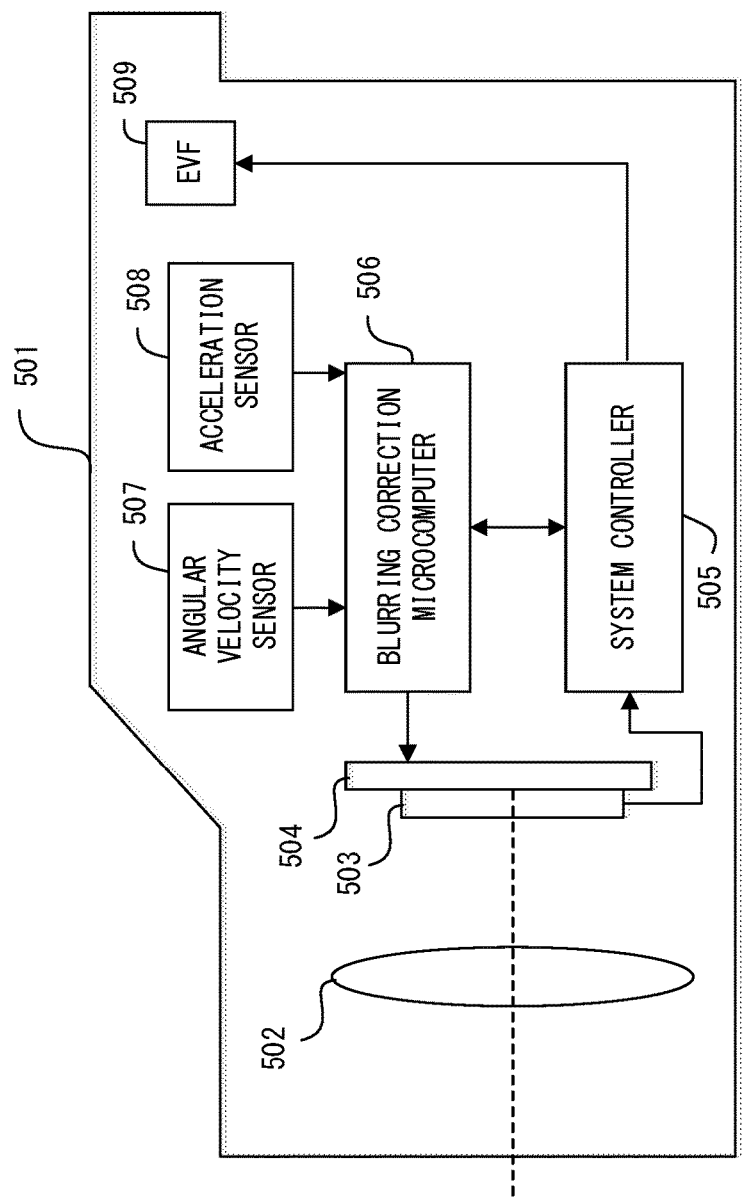
FIG. 5 is a block diagram illustrating the configuration of a camera that is an image capturing apparatus that includes an image blurring correction apparatus in accordance with a first embodiment.

FIG. 5 is a block diagram illustrating the configuration of a camera that is an image capturing apparatus that includes an image blurring correction apparatus in accordance with a first embodiment.

A camera 501 depicted in FIG. 5 has a shake correction function. The camera 501 includes an optical system 502, an image pickup element 503, a driver 504, a system controller 505, a blurring correction microcomputer 506, an angular velocity sensor 507, an acceleration sensor 508, and an electronic view finder (EVF) 509.

The optical system 502 forms a light flux from a subject on the image pickup element 503 as a subject image. For example, the optical system 502 may include a plurality of lenses, including a focus lens and a zoom lens.

The image pickup element 503 converts the subject image formed on an imaging plane (i.e., image formation plane) thereof into an electric signal to function as a pixel signal. For example, the image pickup element 503 may be an image sensor such as a charge coupled device (CCD) or a complementary metal oxide semiconductor (CMOS).

The driver 504 is a drive mechanism that moves the image pickup element 503 in a direction (a direction perpendicular to an optical axis of the optical system 502) parallel to the imaging plane. The driver 504 includes a plurality of actuators for translating the image pickup element 503. For example, the plurality of actuators may be voice coil motors (VCMs).

The system controller 505 reads, as image data, the electric signal resulting from the conversion performed by the image pickup element 503 and applies various image processing to the read image data. The system controller 505 also displays image data that has undergone image processing on the EVF 509 or records such image data in a memory (not illustrated) (e.g., a removable recording medium such as a memory card). In addition, the system controller 505 performs overall control of the camera 501, including data communications with the blurring correction microcomputer 506.

The angular velocity sensor 507 detects angular velocities associated with rotational motions of the camera 501 in the Yaw direction and the Pitch direction and outputs, as a detection signal, an analog signal that corresponds to the detected angular velocities.

The acceleration sensor 508 detects accelerations of the camera 501 that occur in the X direction and the Y direction and outputs, as a detection signal, an analog signal that corresponds to the detected accelerations.

The blurring correction microcomputer 506 calculates an angular blurring amount from the detection signal of the angular velocity sensor 507 and calculates a translational blurring amount from the detection signal of the acceleration sensor 508. In accordance with the calculated angular blurring amount and translational blurring amount, the blurring correction microcomputer 506 controls the driver 504 so as to move the image pickup element 503 in a direction such that image shifting that occurs on the imaging plane of the image pickup element 503 is canceled out.

The camera 501 uses a scheme wherein image blurring is corrected by moving the image pickup element 503 in a direction parallel to the imaging plane (what is called an image sensor shift scheme). However, the image-blurring correction scheme is not limited to this. For example, a scheme that can be used may be one wherein image blurring is corrected by moving a lens included in an optical system in a direction perpendicular to an optical axis of this optical system (what is called a lens shift scheme) or one wherein the influence of image blurring is reduced through image processing such as changing an image cut-out position pertaining to image data read from an image pickup element (electronic scheme). Two or more image blurring correction schemes may be used, and for example, a combination of two or all of the image sensor shift scheme, the lens shift scheme, and the electronic scheme may be used.

The system controller 505 and the blurring correction microcomputer 506 of the camera 501 may each include, for example, a memory and a processor such as a CPU, and the processor executes a program recorded in the memory so as to implement the functions of each of the system controller 505 and the blurring correction microcomputer 506. Alternatively, the system controller 505 and the blurring correction microcomputer 506 may each be formed from a dedicated circuit such as an application specific integrated circuit (ASIC) or a field-programmable gate array (FPGA).

Figure 6:
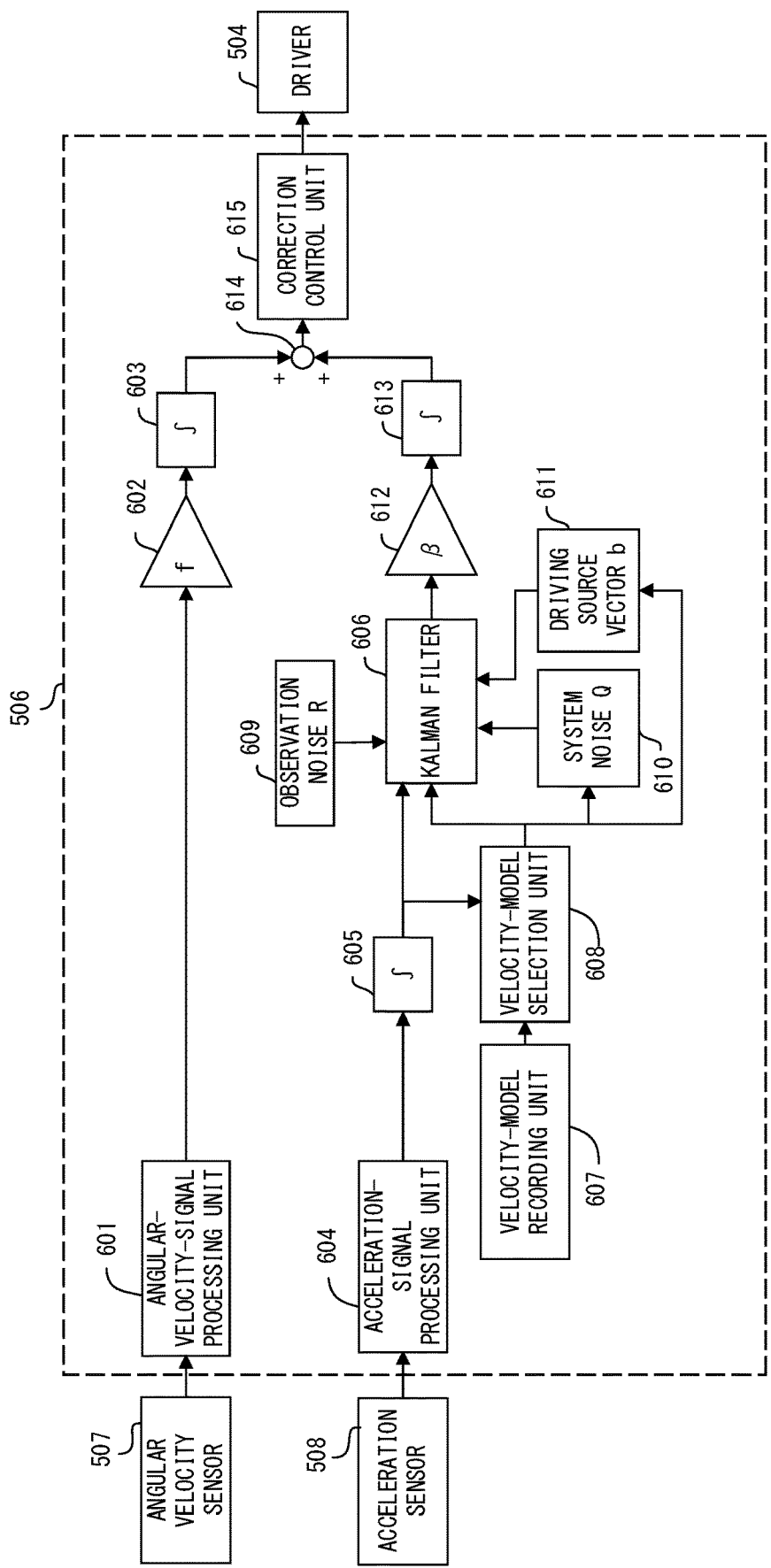
FIG. 6 illustrates the configuration of a blurring correction microcomputer in accordance with a first embodiment.

FIG. 6 illustrates the configuration of the blurring correction microcomputer 506.

The blurring correction microcomputer 506 has a configuration for correcting image blurring on the imaging plane in the X direction and a configuration for correcting image blurring on the imaging plane in the Y direction. The configurations for the X direction and the Y direction are essentially the same. Accordingly, only one of these configurations is depicted FIG. 6, and the other is not illustrated therein. Descriptions are given herein of the one configuration, and descriptions of the other are omitted herein.

The blurring correction microcomputer 506 depicted in FIG. 6 calculates and sums an angular blurring amount and a translational blurring amount so as to calculate the amount of image shifting on the imaging plane.

First, descriptions are given of the configuration pertaining to calculation of an angular blurring amount.

The blurring correction microcomputer 506 depicted in FIG. 6 is such that an angular-velocity-signal processing unit 601 converts an analog signal (detection signal) output from the angular velocity sensor 507 into a digital value corresponding to an angular velocity and subtracts a reference value from this digital value. The reference value corresponds to output of the angular velocity sensor 507 provided when the camera 501 is in a stationary state. Thus, the result of subtraction of the reference value is 0 when the camera 501 is in a stationary state. A sign for the result of subtraction of the reference value indicates a direction of rotation of the camera 501. The angular-velocity-signal processing unit 601 may perform a filtering process on an as-needed basis.

A multiplication unit 602 multiplies a focal length (f) by the angular velocity converted by the angular-velocity-signal processing unit 601 into a signed digital value so as to calculate the velocity of image shifting on the imaging plane that is caused by a rotational motion of the camera 501.

An integrating filter 603 time-integrates the image shifting velocity calculated by the multiplication unit 602 so as to calculate the amount of image shifting on the imaging plane that is caused by the rotational motion of the camera 501.

These configurations pertaining to calculation of an angular blurring amount are such that the angular-velocity-signal processing unit 601 performs the acquiring of an output signal of the angular velocity sensor 507, the converting into a digital value, and the subtracting of a reference value on a predetermined sampling cycle. For each result of subtraction of the reference value performed by the angular-velocity-signal processing unit 601, the multiplication unit 602 multiplies the result by the focal length (f). For each predetermined cycle, the integrating filter 603 performs time integration such as adding up (cumulatively adding) results of multiplication provided by the multiplication unit 602 in the cycle.

Next, descriptions are given of the configuration pertaining to calculation of a translational blurring amount.

A translational blurring amount is calculated from an acceleration (movement acceleration) resulting from movement of the camera 501. A translational blurring amount is also the amount of translational shifting of an image.

An acceleration-signal processing unit 604 converts an analog signal (detection signal) output from the acceleration sensor 508 into a digital value corresponding to an acceleration and subtracts a reference value from this digital value. The reference value corresponds to output of the acceleration sensor 508 provided when the camera 501 is in a stationary state. However, an acceleration detected by the acceleration sensor 508 includes a gravitational acceleration. A gravitational acceleration detected by the acceleration sensor 508 is varied with the orientation of the camera 501. Accordingly, the reference value will desirably be such that the subtraction of the reference value also removes the components of the gravitational acceleration detected by the acceleration sensor 508. Techniques for removing (subtracting) the components of a gravitational acceleration from the output of the acceleration sensor are publicly known, and descriptions thereof are omitted herein.

The result of subtraction of the reference value performed by the acceleration-signal processing unit 604 is 0 when the camera 501 is in a stationary state. A sign for the result of subtraction of the reference value indicates a direction of acceleration caused by movement of the camera 501.

An integrating filter 605 time-integrates the acceleration converted by the acceleration-signal processing unit 604 into a signed digital value so as to calculate a translational velocity of the camera 501.

The acceleration-signal processing unit 604 performs the acquiring of an output signal of the acceleration sensor 508, the converting into a digital value, and the subtracting of a reference value on a predetermined sampling cycle. For each predetermined cycle, the integrating filter 605 performs time integration such as adding up (cumulatively adding) results of subtraction provided by the acceleration-signal processing unit 604 in the cycle.

Using an observation noise R609, a system noise Q610, and a driving source vector b611, and a model selected by a velocity-model selection unit 608 from models recorded in a velocity-model recording unit 607, a Kalman filter 606 removes an error (operational noise) included in the translational velocity calculated by the integrating filter 605. Details of these, including the Kalman filter 606, will be described hereinafter by referring to FIG. 7.

A multiplication unit 612 multiplies an image shooting magnification β, of the optical system 502 by the translational velocity with an error removed therefrom by the Kalman filter 606, so as to calculate the velocity of image shifting on the imaging plane.

An integrating filter 613 time-integrates the image shifting velocity calculated by the multiplication unit 612 so as to calculate the amount of image shifting (the amount of translational shifting of the image) on the imaging plane that is caused by the translation of the camera 501. For each predetermined cycle, the integrating filter 613 performs time integration such as adding up (cumulatively adding) results of multiplication provided by the multiplication unit 612 in the cycle.

An addition unit 614 adds the image shifting amount calculated by the integrating filter 603 (the amount of image shifting on the imaging plane caused by the rotation of the camera 501 (image shifting amount of angular blurring)) and the image shifting amount calculated by the integrating filter 613 (the amount of image shifting on the imaging plane caused by the translational movement of the camera 501 (image shifting amount of translational blurring)) so as to calculate an image shifting amount resulting from the rotation and translational movement of the camera 501.

A correction control unit 615 gives (outputs a driving signal) the driver 504 a driving instruction for moving the image pickup element 503 in a direction such that the image shifting amount calculated by the addition unit 614 is canceled out.

The addition unit 614 of the blurring correction microcomputer 506 depicted in FIG. 6 calculates an image shifting amount caused by camera shaking associated with a combination of angular blurring and translational blurring. The correction control unit 615 can control the driver 504 on the basis of the calculated image shifting amount, thereby allowing, for example, macro shooting, in which translational blurring tends to occur, to be performed without blurring.

The angular velocity sensor 507 and the acceleration sensor 508 of the camera 501 are not limited to a configuration in which an analog signal is output as a detection signal but may have a configuration in which a digital value is output. For a configuration in which a digital value is output, however, an interface (e.g., a serial interface) for reading the digital value needs to be provided for the blurring correction microcomputer 506.

Figure 7:
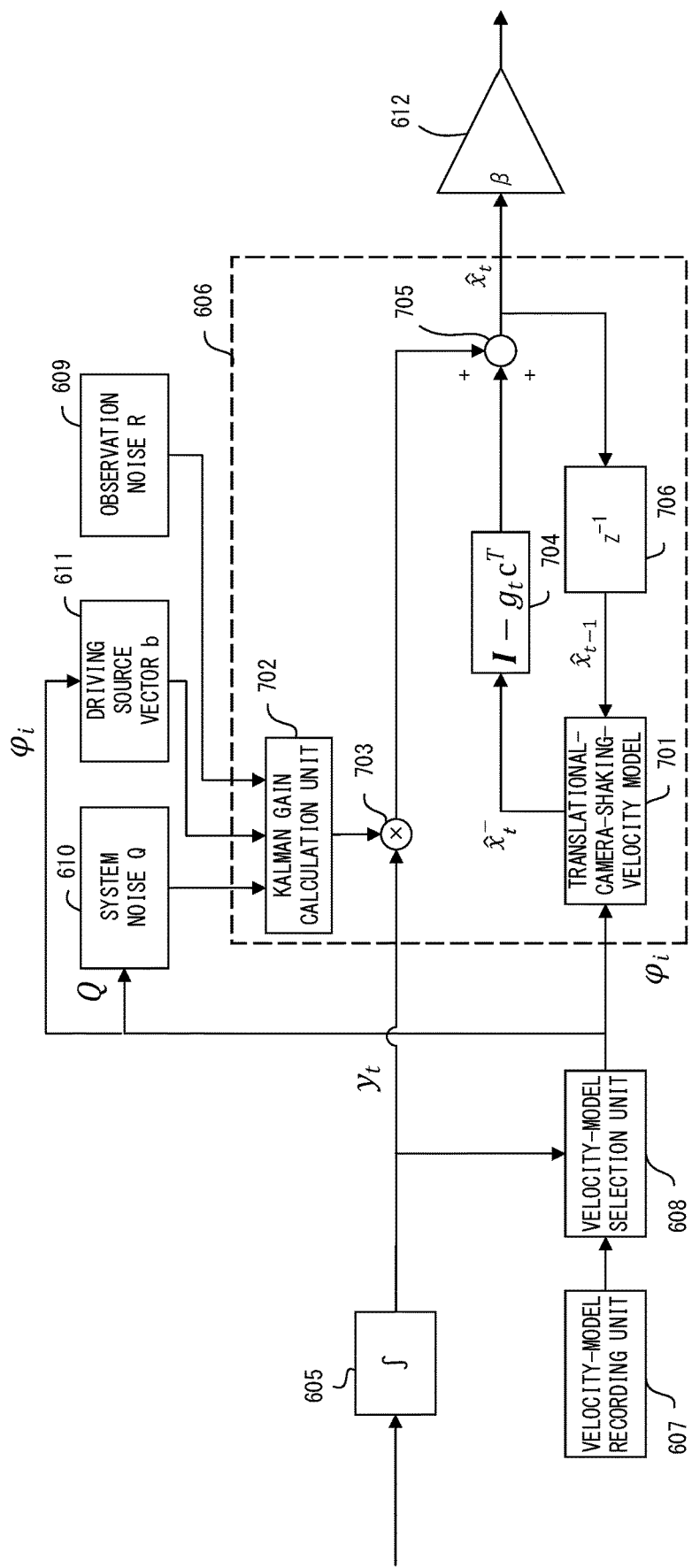
FIG. 7 illustrates the configuration of a Kalman filter in accordance with a first embodiment.
Figure 8:
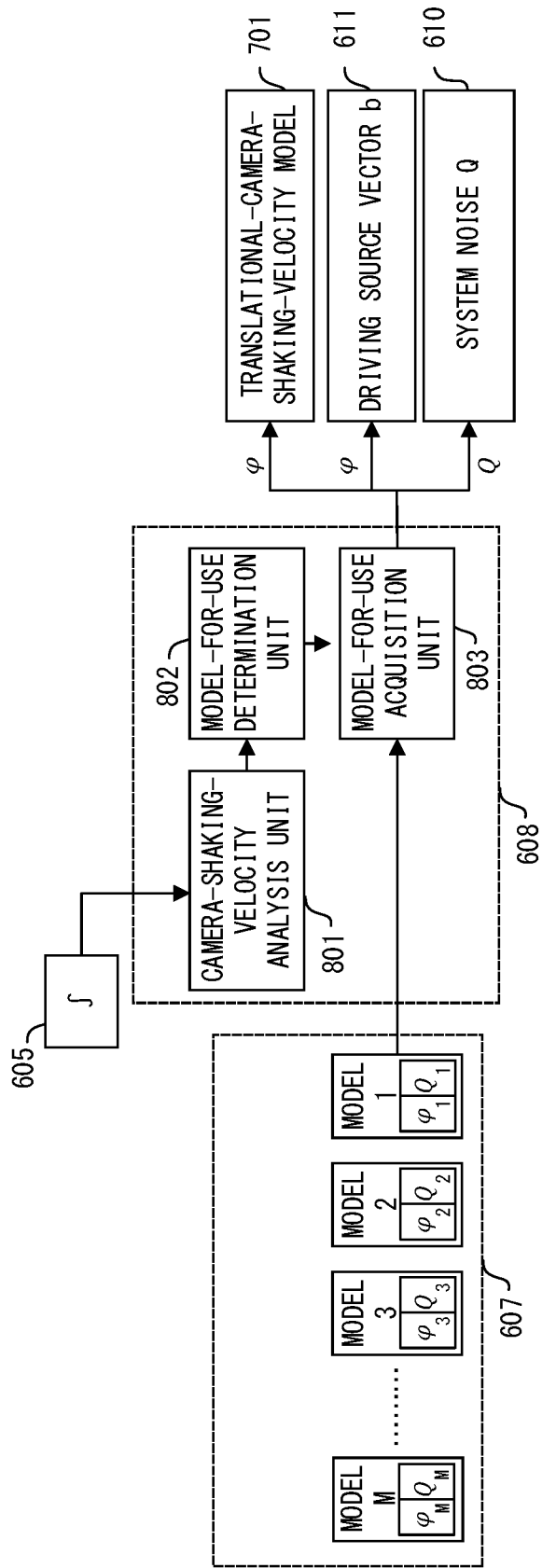
FIG. 8 illustrates the configurations of a velocity-model recording unit and a velocity-model selection unit in accordance with a first embodiment.

FIG. 7 illustrates the configuration of the Kalman filter 606. FIG. 8 illustrates the configurations of the velocity-model recording unit 607 and the velocity-model selection unit 608.

As described above by referring to FIG. 1 and the like, the Kalman filter 606 needs a model that corresponds to a given system (the model 107 corresponding to the system 104 with reference to FIG. 1). As a general rule, models of transfer characteristics of given systems are often known. In the present embodiment, however, such models are not known.

Accordingly, the present embodiment is such that a translational velocity resulting from camera shaking is modeled using an auto-regressive (AR) model with which a model can be generated from time series data of an actually obtained physical amount and the resultant model is used. Details of the AR model will be described hereinafter.

Regarding translational blurring, such blurring is varied according to who holds the camera 501 or how the camera 501 is oriented, and hence optimum models need to be used in consideration of characteristics of users and characteristics of the differences between the postures of the users. In the present embodiment, accordingly, a plurality models are prepared in advance, and a model is selected in accordance with translational blurring at that time point and used.

When the AR model is used, setting a model order results in the setting of a particular state equation, and hence model parameters are a n-th order auto-regressive coefficient $\varphi_i = [\varphi_0, \varphi_1, \varphi_2, \ldots, \varphi_n]$ and a model estimated error Q. With reference to the present embodiment, examples are indicated in which the possibility and operational precision when implementing the operational processing circuit or the operational program of the blurring correction microcomputer 506 are considered. In the following, a n-th order auto-regressive coefficient is described as a third-order auto-regressive coefficient $\varphi_3 = [\varphi_0, \varphi_1, \varphi_2, \varphi_3]$ ($\varphi_0$ is a constant term and thus is not used as 0).

As depicted in FIG. 8, models (auto-regressive coefficients φ and estimated errors Q of AR models) for accommodating various cases are recorded in the velocity-model recording unit 607. For example, a model for accommodating an unstable posture of a photographer causing strong translational blurring, a model for accommodating a stable posture of a photographer causing weak translational blurring, and a model for accommodating a posture of an average photographer may be recorded.

For each predetermined cycle, a camera-shaking-velocity analysis unit 801 of the velocity-model selection unit 608 accumulates, as time series data, translational velocities calculated by the integrating filter 605 in the cycle and analyzes the time series data. For example, every one second, an analysis such as a fast Fourier transform (FFT) analysis may be performed on time series data corresponding to the one second so as to determine a main blurring frequency band and amplitude. The main blurring frequency band and amplitude may also be determined using another simple method.

A model-for-use determination unit 802 determines a model having the closest characteristics to the current blurring state by using the result of analysis provided by the camera-shaking-velocity analysis unit 801.

A model-for-use acquisition unit 803 obtains, on the basis of the result of determination provided by the model-for-use determination unit 802, models to be used (an auto-regressive coefficient φ and an estimated error Q of an AR model) from the velocity-model recording unit 607 and designates the obtained auto-regressive coefficient φ for a translational-camera-shaking-velocity model 701 and the driving source vector b611 and designates the obtained estimated error Q for the system noise Q610.

Accordingly, optimum translational-camera shaking-velocity models are selected in accordance with the camera shaking characteristics of individual users or how the camera is supported.

Next, descriptions are given of a state equation and an observation equation pertaining to the Kalman filter 606.

A state $x_t$ is expressed as the following vector variable formula (8), where $v_t$ is a translational velocity at time t, and $x_t$, i.e., a state to be determined, is an element of a translational velocity for a period from the present time to t−2.

$$x_t = \begin{bmatrix} V_t \\ V_{t-1} \\ V_{t-2} \end{bmatrix} \quad \text{Formula (8)}$$

In this case, the state equation and the observation equation pertaining to the Kalman filter 606 when using the AR model are expressed as the following formulae (9) and (10), where an observation value $y_t$ is a translational velocity.

$$\text{State equation: } x_t = \begin{bmatrix} I_2 & \varphi_1 \\ & \varphi_2 \\ 0 & \varphi_3 \end{bmatrix} x_{t-1} + \begin{bmatrix} \varphi_1 \\ \varphi_2 \\ \varphi_3 \end{bmatrix} v_t \quad \text{Formula (9)}$$

$$\text{Observation equation: } y_t = [1\ 0\ 0]x_t + w_t \quad \text{Formula (10)}$$

The two formulae, the state equation (formula (9)) and the observation equation (formula (10)), constitute a state space model used in the present embodiment.

Coefficients in the above-described formulae (3)-(7) are as follows in accordance with the state equation (formula (9)) and the observation equation (formula (10)).

$$A = \begin{bmatrix} I_2 & \varphi_1 \\ & \varphi_2 \\ 0 & \varphi_3 \end{bmatrix}, b = \begin{bmatrix} \varphi_1 \\ \varphi_2 \\ \varphi_3 \end{bmatrix}, c^T = [1\ 0\ 0]$$

where $I_2$ is a unit matrix with 2 rows and 2 columns.

Let a system noise Q610 be a variance of a system noise $v_t$ for driving the translational-camera-shaking-velocity model 701 and an observation noise R609 be a variance of an observation noise $w_t$ of input (translational velocity). Q corresponds to q in formula (4), and R corresponds to r in formula (5).

Correlations between the coefficients A, b, $c^T$, r, and q and elements indicated in FIGS. 6 and 7 are as follows.

A: Translational-camera-shaking-velocity model 701
B: Driving source vector b611
$c^T$: Inside of Kalman gain calculation unit 702, operation unit 704
Q: System noise Q610
R: Observation noise R609

Setting all of the coefficients in this way results in the setting of the Kalman filter 606, and a posteriori state estimate value $\hat{x}_t$ to be obtained for the state $x_t$ can be expressed as the following formula (11).

$$\hat{x}_t = \begin{bmatrix} \hat{V}_t \\ \hat{V}_{t-1} \\ \hat{V}_{t-2} \end{bmatrix} \quad \text{Formula (11)}$$

$\hat{x}$ in this formula is a three-dimensional vector, and thus a current estimated velocity $\hat{V}_t$ is extracted and input to the multiplication unit 612.

The following describes the data flow within the Kalman filter 606 by referring to FIG. 7.

A posteriori state estimate value $\hat{x}_t$ is turned by a delay operator $Z^{-1}$ 706 into a state estimate value $\hat{x}_{t-1}$ for a preceding time (time t−1). A priori state estimate value $\hat{x}^-_t$ is calculated in accordance with the state estimate value $\hat{x}_{t-1}$ for the preceding time (time t−1) and the translational-camera-shaking-velocity model 701 (see formula (3)).

The Kalman gain calculation unit 702, which has a similar configuration to the Kalman gain calculation unit 110 depicted in FIG. 3, calculates a priori error covariance matrix $P^-_t$ (see formula (4)), a Kalman gain $g_t$ (see formula (5)), and a posteriori error covariance matrix $P_t$ (see formula (7)) by using the coefficients of A, b, $c^T$, r, and q.

A multiplication unit 703 weights an observation value $y_t$ (a translational velocity calculated by the integrating filter 605) by using the Kalman gain $g_t$, and the operation unit 704 weights the priori state estimate value $\hat{x}_t$ by using the Kalman gain $g_t$. An addition unit 705 adds these weighted values. Accordingly, a posteriori state estimate value $\hat{x}_t$ is calculated.

Next, descriptions are given of an AR model.

An AR model is a model for estimating the value of time series data $x_t$ for time t by using data before time t. A n-th order AR model is expressed as the following formula (12) by using the auto-regressive coefficient $\varphi_i = [\varphi_0, \varphi_1, \varphi_2, \ldots, \varphi_n]$ thereof.

$$X_t = \varphi_0 + \varphi_1 X_{t-1} + \varphi_2 X_{t-2} \cdots \varphi_n X_{t-n} \quad \text{Formula (12)}$$

The auto-regressive coefficient $\varphi_i$ may be determined from the time series data by using the Yule-Walker equation or a least square method.

The following describes an example in which the Yule-Walker equation is used.

Let $\{Y_t\}$ be time series data and $c_s$ be a covariance of $Y_t$ and $Y_{t-s}$, i.e., an s-th order auto covariance. The value of the auto-regressive coefficient $\varphi_i = [\varphi_0, \varphi_1, \varphi_2, \ldots, \varphi_n]$ may be calculated by solving the following Yule-Walker equation (formula (13)).

$$\begin{bmatrix} c_1 \\ c_2 \\ \vdots \\ c_{n-1} \\ c_n \end{bmatrix} = \begin{bmatrix} c_0 & c_1 & \cdots & c_{n-2} & c_{n-1} \\ c_1 & c_0 & \ddots & \ddots & c_{n-2} \\ \vdots & \ddots & \ddots & \ddots & \vdots \\ c_{n-2} & \ddots & \ddots & c_0 & c_1 \\ c_{n-1} & c_{n-2} & \cdots & c_1 & c_0 \end{bmatrix} \begin{bmatrix} \varphi_1 \\ \varphi_2 \\ \vdots \\ \varphi_{n-1} \\ \varphi_n \end{bmatrix} \quad \text{Formula (13)}$$

In particular, precise time series data of translational blurring is required to calculate $\varphi_i$. In the present embodiment, time series data of a translational blurring velocity is used to create models (models recorded in the velocity-model recording unit 607) in accordance with the above-mentioned scheme.

The following describes an example of a method of obtaining time series data of a translational blurring velocity to be used to create a model.

Under image-shooting conditions in which camera shaking occurs, the camera 501 performs moving-image shooting with macro shooting performed and with an accurate correction of angular blurring made. The moving-image shooting performed in this case involves shooting an image of a subject chart appropriate for obtaining the amount of shift between frames (optical flow). The camera 501 accurately corrects angular blurring, i.e., completely corrects the angular blurring.

Accordingly, the blurring correction microcomputer 506 depicted in FIG. 6 is such that the components ranging from the acceleration-signal processing unit 604 to the integrating filter 613 stop calculation of an image shifting amount resulting from translational shifting of the camera 501 and the correction control unit 615 controls the driver 504 by using only a result of calculation of image shifting caused by rotation of the camera 501.

Through such a process, moving image data from which angular blurring has completely been eliminated and in which the influence of only translational blurring remains is obtained. Thus, a temporal change in the translational velocity may be calculated by analyzing the amount of shift between frames in the subject chart indicated by the moving image data.

Specifically, a translational velocity $Y_k$ of the camera 501 can be determined using the following formula (14) from an inter-frame shifting amount $\lambda_k^{opt}$, an inter-frame time period $\Delta t$, a pixel pitch d, and an image shooting magnification $\beta$.

$$Y_k = \frac{\lambda_k^{opt} d}{\Delta t \beta} \qquad \text{Formula (14)}$$

Thus, time series data {Yt} of the translational blurring velocity is obtained from the moving image data.

Characteristics of translational velocities are varied according to who holds the camera 501 or how the camera 501 is oriented.

Accordingly, for example, in a production process before factory shipment of the camera 501, AR models may be created by preparing in advance a plurality of pieces of time series data for different users and orientations for image shooting. Models with close frequencies and amplitude characteristics among the created models may be grouped and averaged to create a generalized model for a certain condition. This process may be performed for each condition so as to create a model and prepare parameters for each condition (i.e., record a model and parameters in the velocity-model recording unit 607 for each condition). In this case, model parameters are an auto-regressive coefficient $\varphi_i = [\varphi_0, \varphi_1, \varphi_2, \ldots, \varphi_n]$ and an estimated error variance Q of an AR model.

Figure 9:
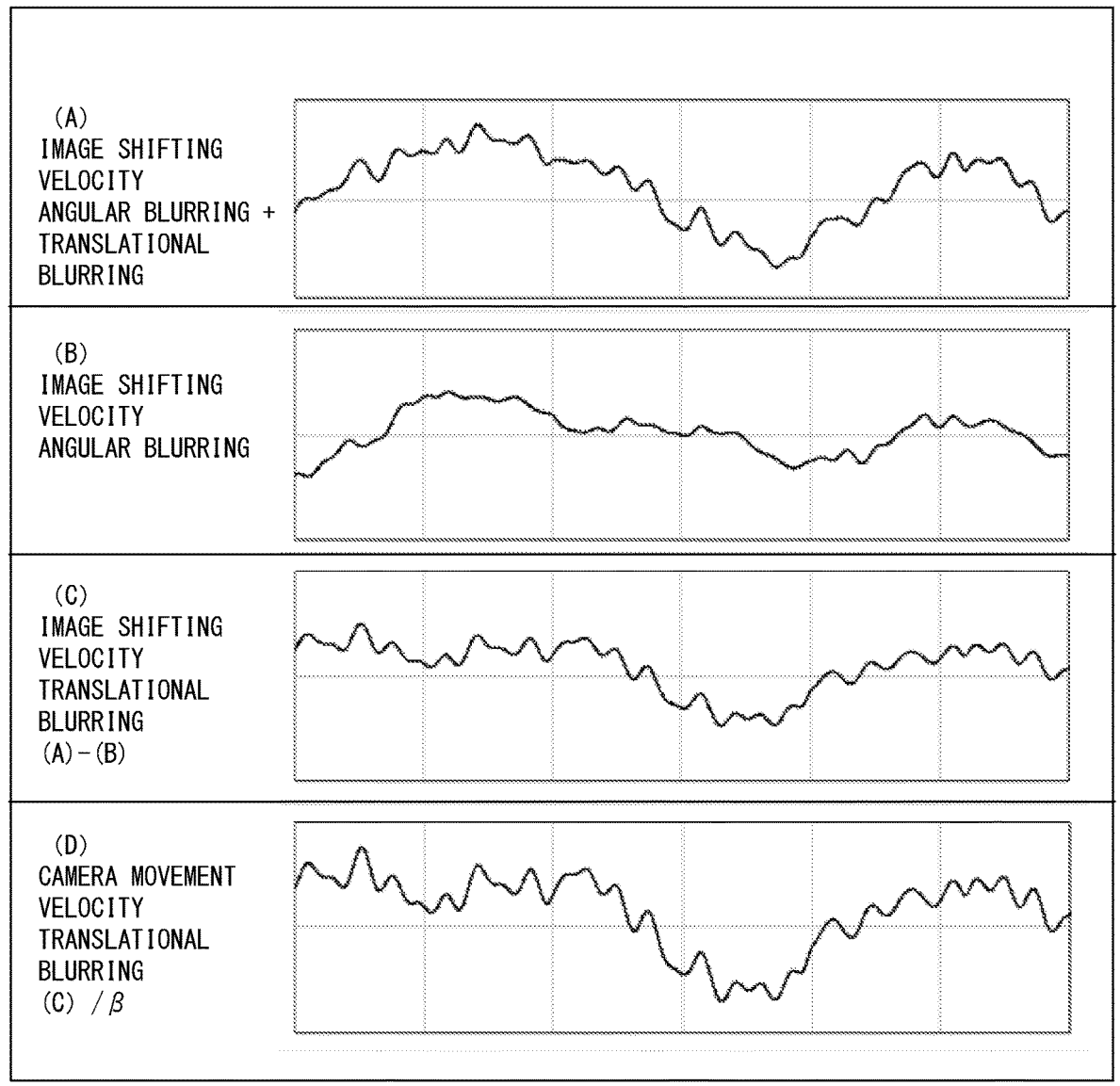
FIG. 9 illustrates examples of time series data in accordance with a first embodiment.

FIG. 9 illustrates examples of time series data in accordance with the present embodiment.

(A) in FIG. 9 indicates the velocity of image shifting that occurs on an imaging plane when an image blurring correction is not made, and this velocity is affected by both angular blurring and translational blurring.

(B) indicates an image shifting velocity resulting from angular blurring calculated by the blurring correction microcomputer 506.

(C) indicates an inter-frame-image-shifting velocity obtained from moving image data acquired when image blurring is corrected by driving the driver 504 on the basis of the image shifting velocity indicated in (B) that results from angular blurring (corresponding to (A) minus (B)). If the angular blurring is completely corrected, the image shifting velocity indicated in (C) will be equal to the translational blurring on the imaging plane.

(D) indicates the movement velocity of the camera 501 that is obtained by dividing the image shifting velocity indicted in (C) by an image shooting magnification $\beta$ ((C) divided by $\beta$).

Second Embodiment

The following describes a second embodiment. The second embodiment is described herein by referring mainly to differences from the first embodiment. Like components in the second embodiment are given like reference marks to those in the first embodiment, and descriptions thereof are omitted herein.

A camera 501, i.e., an image capturing apparatus that includes an image blurring correction apparatus in accordance with the second embodiment, has a dedicated-for-creation-of-translational-camera-shaking-velo city-model mode as an operation mode that can be set by the user. When the dedicated-for-creation-of-translational-camera-shaking-velo city-model mode is set, the camera 501 obtains time series data of a translational velocity for a usage environment of the user, creates a translational-camera-shaking-velocity model by using the time series data, and uses this created model for a shake correction in image shooting.

Thus, a translational-camera-shaking-velocity model optimum for the user is generated when the user sets the dedicated-for-creation-of-translational-camera-shaking-velo city-model mode as an operation mode. Accordingly, more accurate blurring corrections adapted for characteristics of individual users can be implemented.

Figure 10:
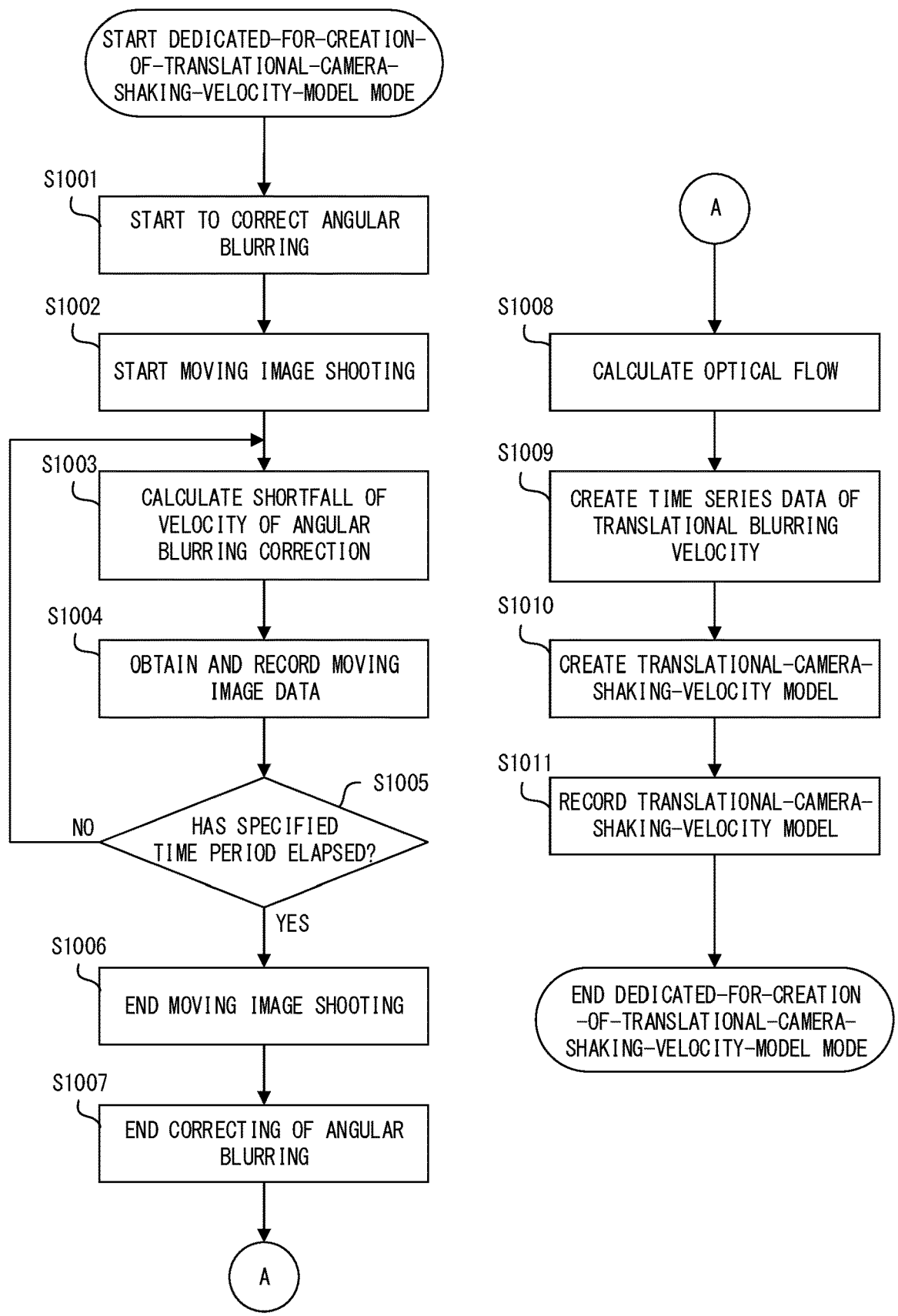
FIG. 10 is a flowchart illustrating the flow of a process performed when a dedicated-for-creation-of-translational-camera-shaking-velo city-model mode in accordance with a second embodiment is set.

FIG. 10 is a flowchart illustrating the flow of a process performed when the dedicated-for-creation-of-translational-camera shaking-velocity-model mode is set.

The camera 501 starts the process depicted in FIG. 10 when the dedicated-for-creation-of-translational-camera-shaking-velo city-model mode is set.

The camera 501 starts to correct angular blurring (S1001) and starts moving image shooting (S1002). In this example, a chart appropriate for obtaining an optical flow is an object to be imaged.

The camera 501 performs an angular-blurring-correction-velocity-shortfall calculation process (S1003). Details of this process will be described hereinafter.

The camera 501 obtains and records moving image data (S1004).

The camera 501 determines whether a specified time period has elapsed since the start of moving image shooting (S1005). The specified time period corresponds to a period of moving image shooting required to increase a frequency resolution based on frequency analysis of the optical flow and is, for example, a few to ten seconds.

When a result of determination in S1005 is NO, the process returns to S1003. Thus, the angular-blurring-correction-velocity-shortfall calculation process (S1003) and the obtaining and recording of moving image data (S1004) are repeatedly performed until the result of S1005 becomes YES.

When the result of determination in S1005 is YES, the camera 501 ends the moving image shooting (S1006) and ends the correcting of angular blurring (S1007).

The camera 501 calculates the optical flow from the recorded moving image data (S1008).

The camera 501 creates time series data of a translational velocity (translational blurring velocity) from the calculated optical flow and the angular-blurring-correction-velocity shortfall calculated during the moving image shooting (S1009). Calculation formula used in this creating process will be described hereinafter.

The camera 501 creates a translational-camera-shaking-velocity model from the time series data of translational velocity by using the Yule-Walker equation as in the first embodiment (S1010).

The camera 501 records the created translational-camera-shaking-velocity model in the velocity-model recording unit 607 (S1011), and the process depicted in FIG. 10 ends.

The following describes the angular-blurring-correction-velocity-shortfall calculation process (S1003) in detail.

Figure 11:
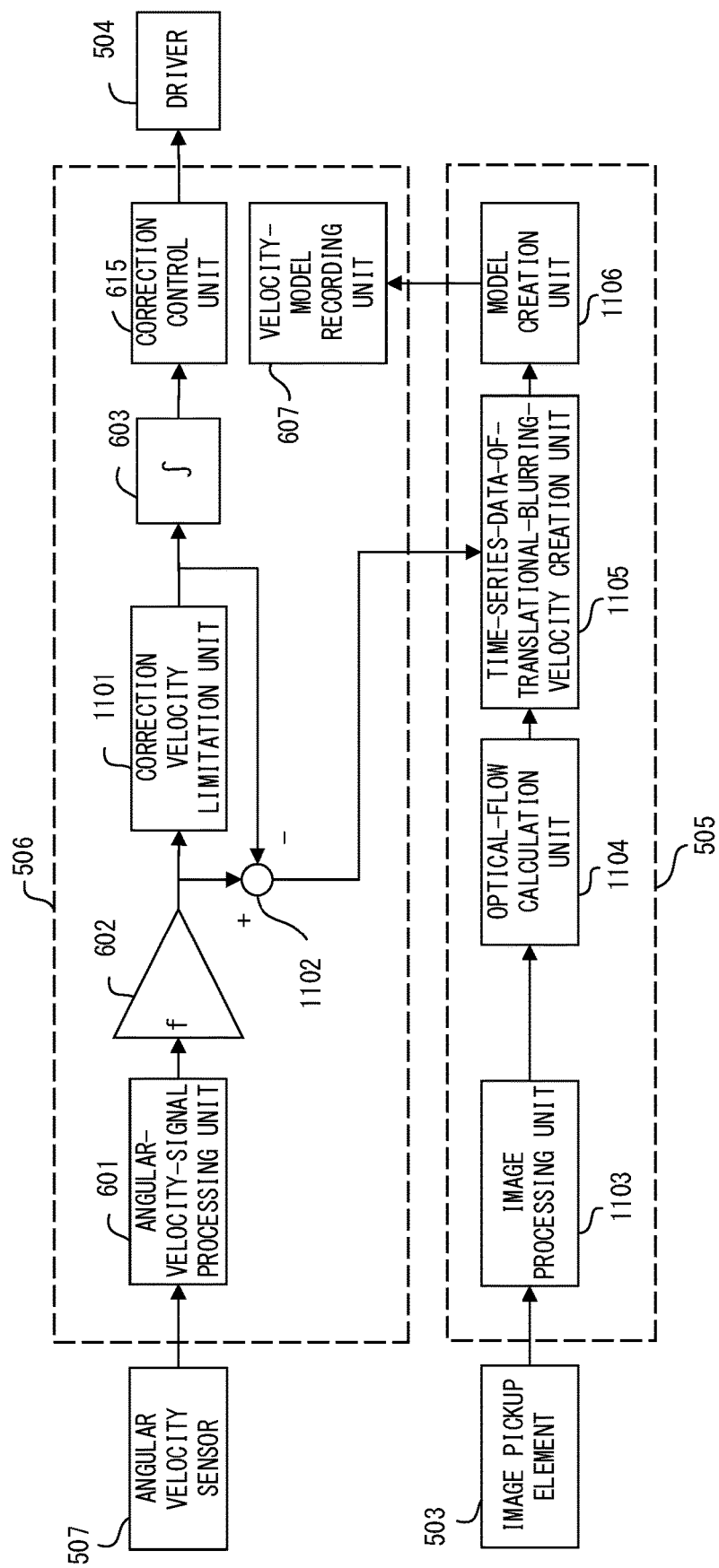
FIG. 11 illustrates the configurations of a blurring correction microcomputer and a system controller in accordance with a second embodiment.

FIG. 11 illustrates the configurations of a blurring correction microcomputer 506 and a system controller 505 in accordance with the second embodiment. However, FIG. 11 depicts only components related to the process depicted in FIG. 10.

A correction velocity limitation unit 1101 in FIG. 11 limits an image shifting velocity calculated by the multiplication unit 602 so as to limit the amount of correction of angular blurring. Accordingly, the blurring correction microcomputer 506 corrects angular blurring by operating the driver 504 in accordance with the limited angular blurring amount.

As the process depicted in FIG. 10 requires a time period of about a few to ten seconds (the specified time period described above) for moving image shooting, the correction velocity limitation unit 1101 is provided to prevent the state of the driver 504 from exceeding a correctable range during moving image shooting.

A subtraction unit 1102 calculates an angular-blurring-correction-velocity shortfall $\lambda_k^{\theta short}$ by subtracting the image shifting velocity limited by the correction velocity limitation unit 1101 from the image shifting velocity calculated by the multiplication unit 602.

Methods of limiting the amount of correction of angular blurring may include various methods such as the above-mentioned method, a method wherein an upper limit is set for the amount of correction within one cycle and a correction is not made for a correction amount exceeding the upper limit, and a method wherein a certain amount is subtracted from a correction amount every cycle. Any of such methods can be used.

An image processing unit 1103, an optical-flow calculation unit 1104, a time-series-data-of-translational-blurring-velocity creation unit 1105, and a model creation unit 1106 in FIG. 11 are components that correspond to the processes of S1002, S1004, S1006, and S1008-S1011 depicted in FIG. 10.

The following describes calculation formulae used in the above-described process of creating time series data of a translational velocity (translational blurring velocity) (S1009).

The influence of a correction remainder resulting from translational blurring and angular blurring emerges as image shifting in recorded moving image data, and thus the influence of translational blurring can be extracted by subtracting an angular-blurring-correction-velocity shortfall $\lambda_k^{\theta short}$. However, the result of this subtraction is image blurring on the imaging plane and accordingly divided by an image magnification (image shooting magnification) at the time of image shooting so as to calculate the translational velocity of the camera 501.

Time series data $Y_k$ of the translational velocity of the camera 501 is determined in accordance with the following formula (15).

$$Y_k = \left( \frac{\lambda_k^{opt} d}{\Delta t} - \lambda_k^{\theta short} \right) \frac{1}{\beta} \quad \text{Formula (15)}$$

where $\lambda_k^{opt}$ is an inter-moving-image-frame image shifting amount, $\lambda_k^{\theta short}$ is an angular-blurring-correction-velocity shortfall, $\Delta t$ is an inter-frame time period, d is a pixel pitch of a moving image pertaining to moving image data, and $\beta$ is an image magnification (image shooting magnification) at the time of image shooting.

A translational-camera-shaking-velocity model is created using the time series data $Y_k$ of the translational velocity that is determined in accordance with formula (15).

The second embodiment is such that a translational-camera-shaking-velocity model is created from camera shaking caused by a user who actually uses the camera 501, and hence differences in characteristics that depend on who uses the camera 501 do not need to be considered, so that an optimum shake correction can be provided for the user.

The second embodiment may be combined with the first embodiment. In this case, when the dedicated-for-creation-of-translational-camera-shaking-velocity-model mode is set, a translational-camera-shaking-velocity model created in accordance with this setting may be used as described above; otherwise, an optimum model selected from models prepared in advance may be used, as described above with reference to the first embodiment.

The model creation unit 1106 in the second embodiment is provided within the system controller 505. However, the model creation unit 1106 may be provided outside the camera 501. In this case, time series data of a translational velocity that is created within the camera 501 may be transferred to an external apparatus such as a personal computer (PC) or a smartphone, and a model may be created by running a program within this external apparatus and returned to the velocity-model recording unit 607 of the camera 501.

Figure 12:
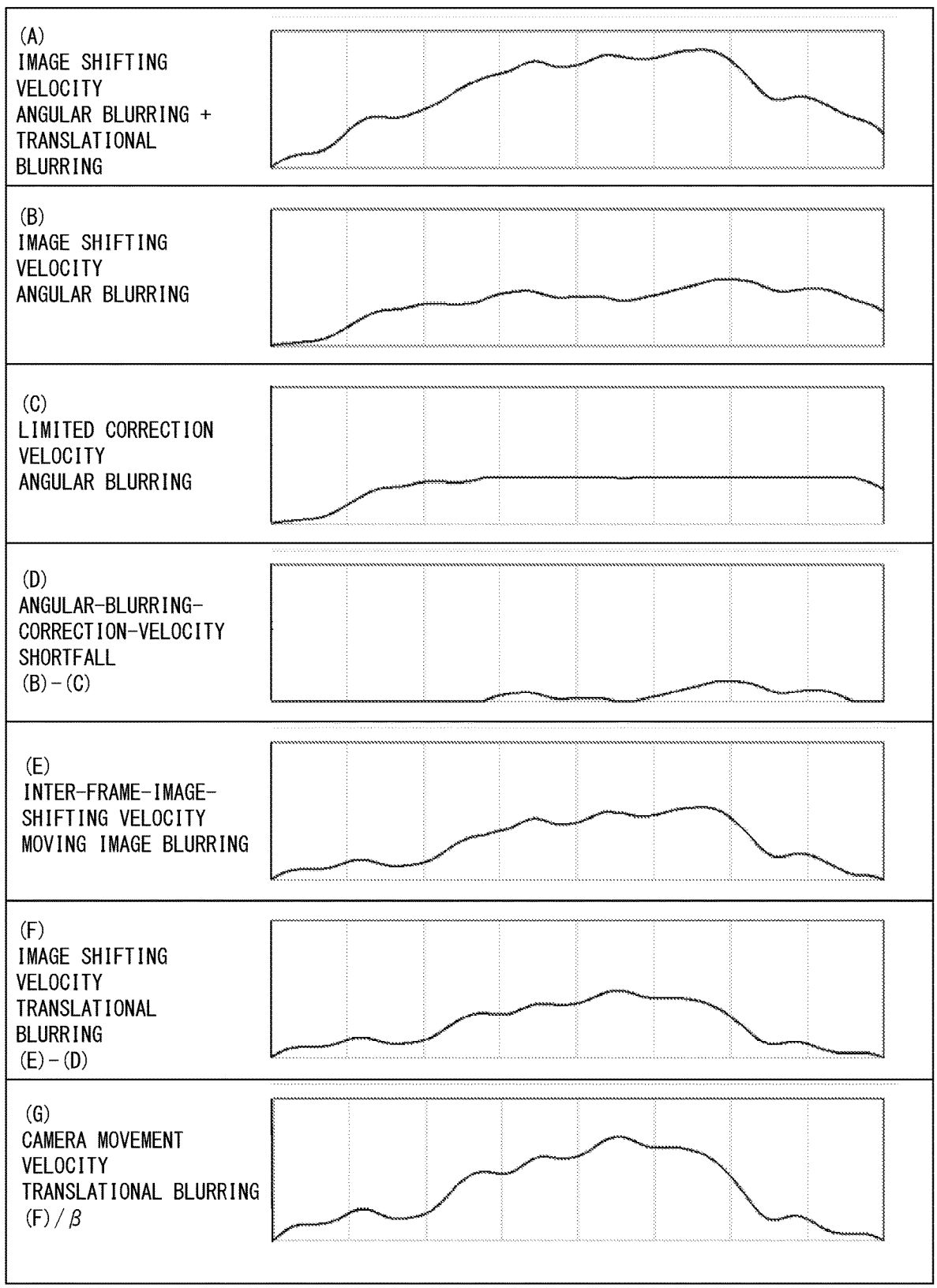
FIG. 12 illustrates examples of time series data in accordance with a second embodiment.

FIG. 12 illustrates examples of time series data in accordance with the second embodiment.

(A) in FIG. 12 indicates the velocity of image shifting that occurs on an imaging plane when an image blurring correction is not made.

(B) indicates an image shifting velocity resulting from angular blurring that is output from the multiplication unit 602.

(C) indicates an image shifting velocity output from the correction velocity limitation unit 1101 that has been limited to a threshold that is a predetermined velocity.

(D) indicates an angular-blurring-correction-velocity shortfall (output of the subtraction unit 1102) obtained by subtracting the limited image shifting velocity indicated in (C) from the image shifting velocity resulting from angular blurring that is indicated by (B) ((B) minus (C)).

(E) indicates an image shifting velocity calculated from an image shifting amount of a moving image pertaining to recorded moving image data.

(F) indicates an image shifting velocity resulting from translational blurring that is obtained by subtracting the angular-blurring-correction-velocity shortfall indicated by (D) from the image shifting velocity indicated by (E) ((E) minus (D)).

(G) indicates the movement velocity of the camera 501 that is obtained by dividing the image shifting velocity indicated by (F) by an image shooting magnification $\beta$ ((F) divided by $\beta$).

Third Embodiment

The following describes a third embodiment. The third embodiment is described herein by referring mainly to differences from the first embodiment. Like components in the third embodiment are given like reference marks to those in the first embodiment, and descriptions thereof are omitted herein.

When making a shake correction during a standby time in image shooting, a camera 501, i.e., an image capturing apparatus that includes an image blurring correction apparatus in accordance with the third embodiment, obtains time series data of a translational velocity from a frame image used for live view, creates a translational-camera-shaking-velocity model in real time by using the time series data, and uses this created model to correct translational blurring.

A large amount of calculation is required to create a translational-camera-shaking-velocity model, and the processor for the camera 501 could take along calculation time for the creation. In this case, the model may be updated on a cycle (e.g., a one-second cycle) longer than a cycle on which shake correction is performed.

Figure 13:
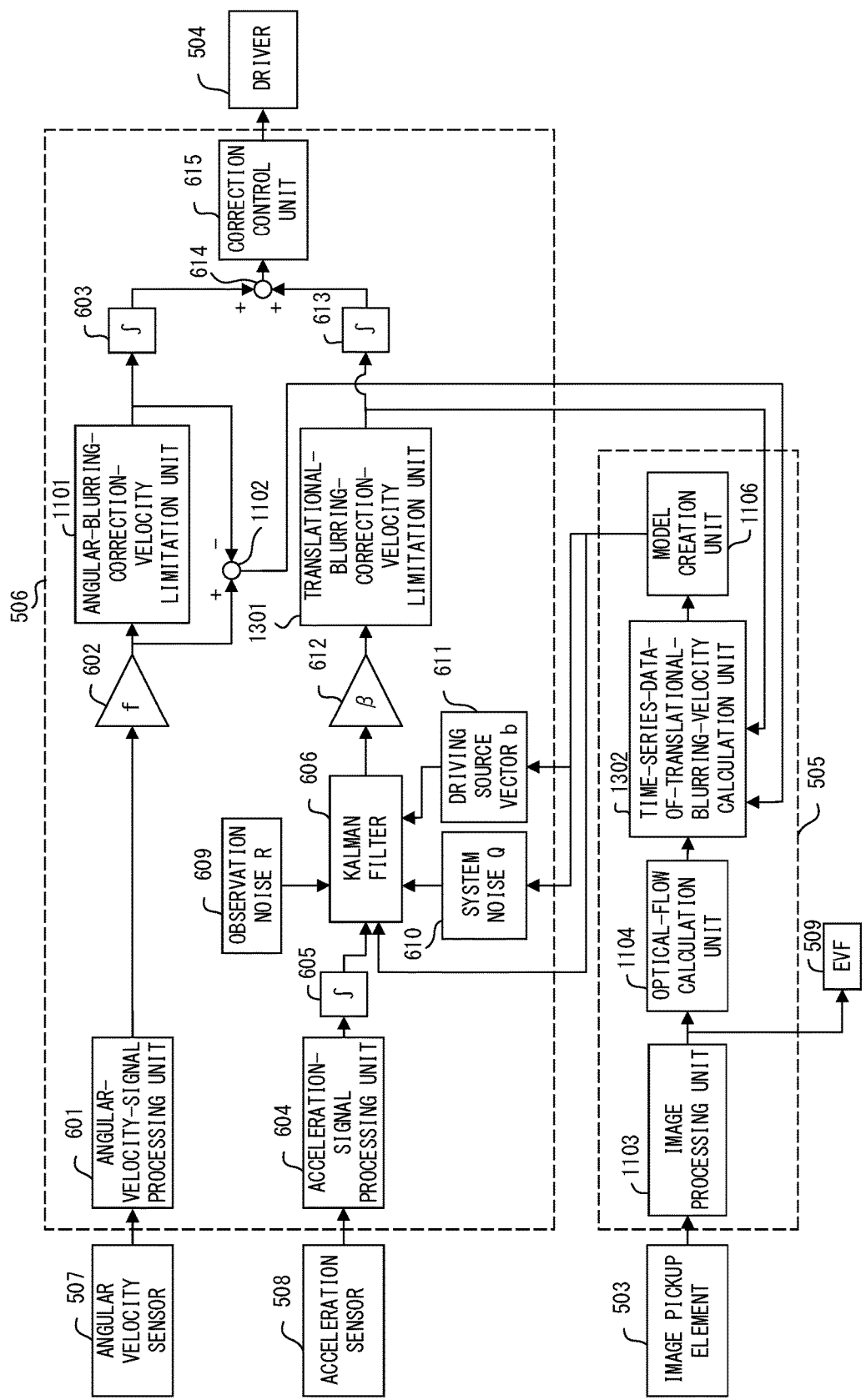
FIG. 13 illustrates the configurations of a blurring correction microcomputer and a system controller in accordance with a third embodiment.

FIG. 13 illustrates the configurations of a blurring correction microcomputer 506 and a system controller 505 in accordance with the third embodiment. However, FIG. 13 only depicts components pertaining to shake correction and the creation of a translational-camera-shaking-velocity model. An angular-blurring-correction-velocity limitation unit 1101, a subtraction unit 1102, an image processing unit 1103, an optical-flow calculation unit 1104, and a model creation unit 1106 depicted in FIG. 13 have similar functions to, and thus assigned the same reference marks as, the correction velocity limitation unit 1101, the subtraction unit 1102, the image processing unit 1103, the optical-flow calculation unit 1104, and the model creation unit 1106 depicted in FIG. 11 described above with reference to the second embodiment.

First, descriptions are given of a shake correction operation performed during live view by referring to FIG. 13.

Note that live view refers to an operation wherein the system controller 505 converts, by means of the image processing unit 1103, video pertaining to image data read from the image pickup element 503 into data formatted to be displayed on the EVF 509 and outputs the resultant data to the EVF 509 so that captured images can be displayed on the EVF 509 in real time.

Shake corrections during live view need to be continuously made. Thus, the blurring correction microcomputer 506 needs to perform control for preventing the state of the driver 504 from exceeding a correctable range while a shake correction is made.

Accordingly, the angular-blurring-correction-velocity limitation unit 1101 is provided to limit the amount of correction of angular blurring. Similarly, a translational-blurring-correction-velocity limitation unit 1301 is provided to limit the amount of correction of translational blurring.

The subtraction unit 1102 calculates an angular-blurring-correction-velocity shortfall $\lambda_k^{\theta short}$ by subtracting the image shifting velocity limited by the angular-blurring-correction-velocity limitation unit 1101 from the image shifting velocity calculated by the multiplication unit 602.

The addition unit 614 sums the angular blurring amount (image shifting amount) obtained according to, for example, the limitation imposed by the angular-blurring-correction-velocity limitation unit 1101 and the translational blurring amount (image shifting amount) obtained according to, for example, the limitation imposed by the translational-blurring-correction-velocity limitation unit 1301 so as to calculate a summed blurring amount (image shifting amount).

The correction control unit 615 gives the driver 504 a driving instruction for moving the image pickup element 503 in a direction such that the summed blurring amount is canceled out, thereby correcting both the angular blurring and the translational blurring on the imaging plane.

The following describes creation of a translational-camera-shaking-velocity model.

The optical-flow calculation unit 1104 of the system controller 505 calculates an inter-frame image shifting amount of video data (image data) that has been read from the image pickup element 503 and undergone image processing performed by the image processing unit 110.

A time-series-data-of-translational-blurring-velocity calculation unit 1302 calculates time series data $Y_k$ of the translational velocity of the camera 501 during live view in accordance with the following formula (16) from an inter-frame image shifting amount $\lambda_k^{opt}$, an inter-frame translational-blurring correction velocity $\lambda_k^{pcorrect}$, and an inter-frame angular-blurring-correction-velocity shortfall $\lambda_k^{\theta short}$ obtained at a certain time point.

$$Y_k = \left(\frac{\lambda_k^{opt} d}{\Delta t \beta} - \lambda_k^{\theta short} + \lambda_k^{pcorrect}\right)\frac{1}{\beta} \qquad \text{Formula (16)}$$

where $\Delta t$ is an inter-frame time period, d is a pixel pitch of a moving image pertaining to moving image data, and $\beta$ is an image magnification (image shooting magnification) at the time of image shooting.

The time series data $Y_k$ of the translational velocity of the camera 501 is accumulated for, for example, one second, and when data for the one second is prepared, the model creation unit 1106 creates a translational-camera-shaking-velocity model. The translational-camera-shaking-velocity model is designated for the Kalman filter 606, the system noise Q610, and the driving source vector b611, and subsequent translational-shake corrections are made.

The third embodiment is such that a model is created from a state immediately before image shooting so that variations in characteristics pertaining to who holds the camera 501 or how the camera 501 is oriented can be addressed.

Figure 14:
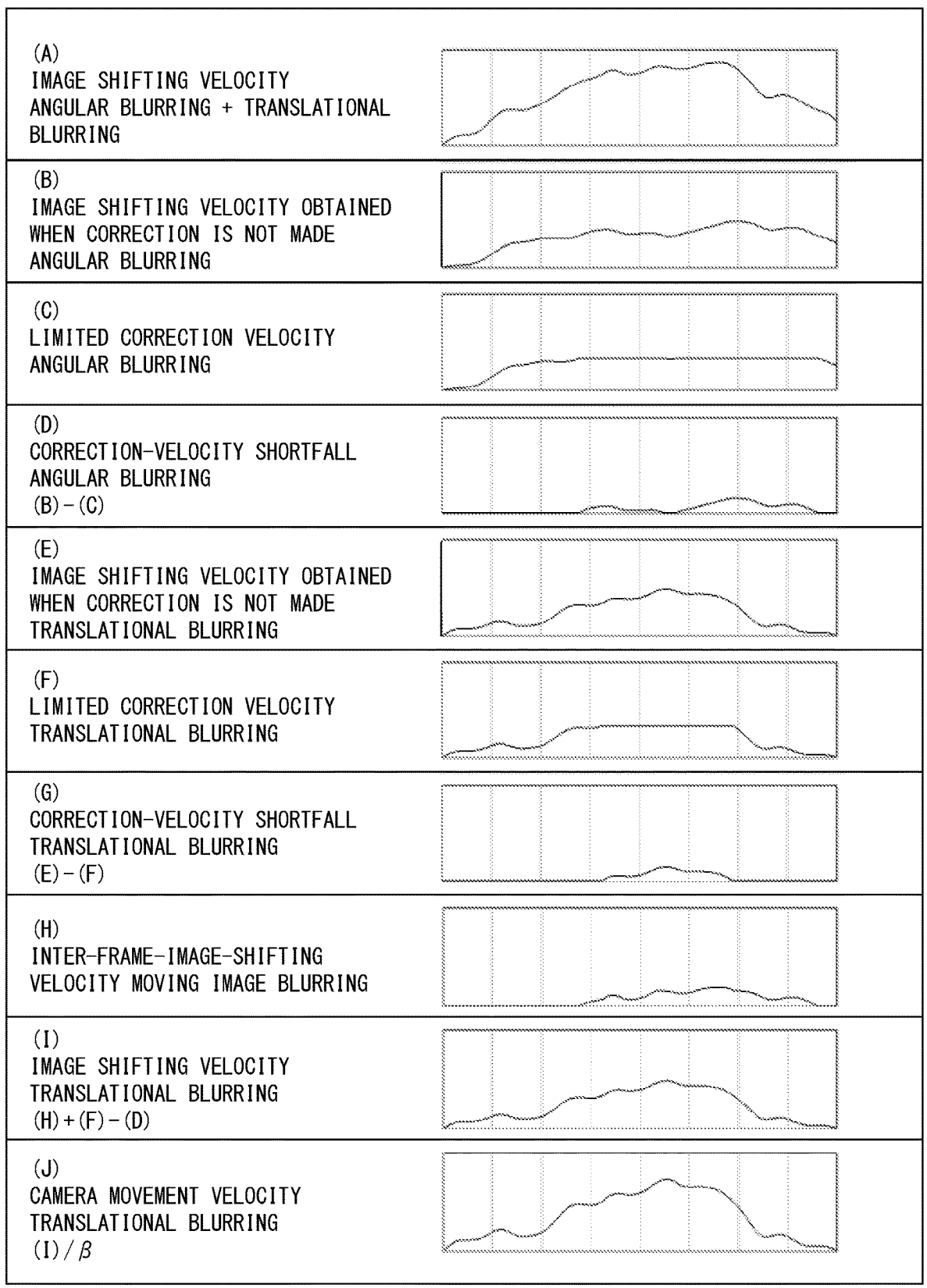
FIG. 14 illustrates examples of time series data in accordance with a third embodiment.

FIG. 14 illustrates examples of time series data in accordance with the third embodiment.

(A) in FIG. 14 indicates the velocity of image shifting that occurs on an imaging plane when a shake correction is not made.

(B) indicates an image shifting velocity resulting from angular blurring that is output from the multiplication unit 602.

(C) indicates an image shifting velocity output from the angular-blurring-correction-velocity limitation unit 1101 that has been limited to a threshold that is a predetermined velocity.

(D) indicates an angular-blurring-correction-velocity shortfall (output of the subtraction unit 1102) obtained by subtracting the limited image shifting velocity indicated in (C) from the image shifting velocity resulting from angular blurring that is indicated by (B) ((B) minus (C)).

(E) indicates the image-shifting velocity of translational blurring (corresponding to the output of the multiplication unit 612) that occurs on the imaging plane when a translational-blurring correction is not made.

(F) indicates an image shifting velocity output from the translational-blurring-correction-velocity limitation unit 1301 that has been limited to a threshold that is a predetermined velocity.

(G) indicates a correction remainder (corresponding to (E) minus (F)) obtained when the image-shifting velocity of translational blurring that is indicated by (E) is corrected on the basis of the limited image shifting velocity indicated by (F).

(H) indicates an image shifting velocity calculated from an inter-frame image shifting amount detected in a moving image pertaining to moving image data.

(I) indicates an image shifting velocity resulting from translational blurring that is obtained by subtracting the angular-blurring-correction-velocity shortfall indicated by (D) from the sum of the limited image shifting velocity indicated by (F) and the image shifting velocity indicated by (H) that is calculated from the inter-frame image shifting amount ((F) plus (H) minus (D)).

(J) indicates the movement velocity of the camera 501 that is obtained by dividing the image shifting velocity indicated by (I) by an image shooting magnification β ((I) divided by β).

Fourth Embodiment

The following describes a fourth embodiment. The fourth embodiment is described herein by referring mainly to differences from the first embodiment. Like components in the fourth embodiment are given like reference marks to those in the first embodiment, and descriptions thereof are omitted herein.

Figure 15:
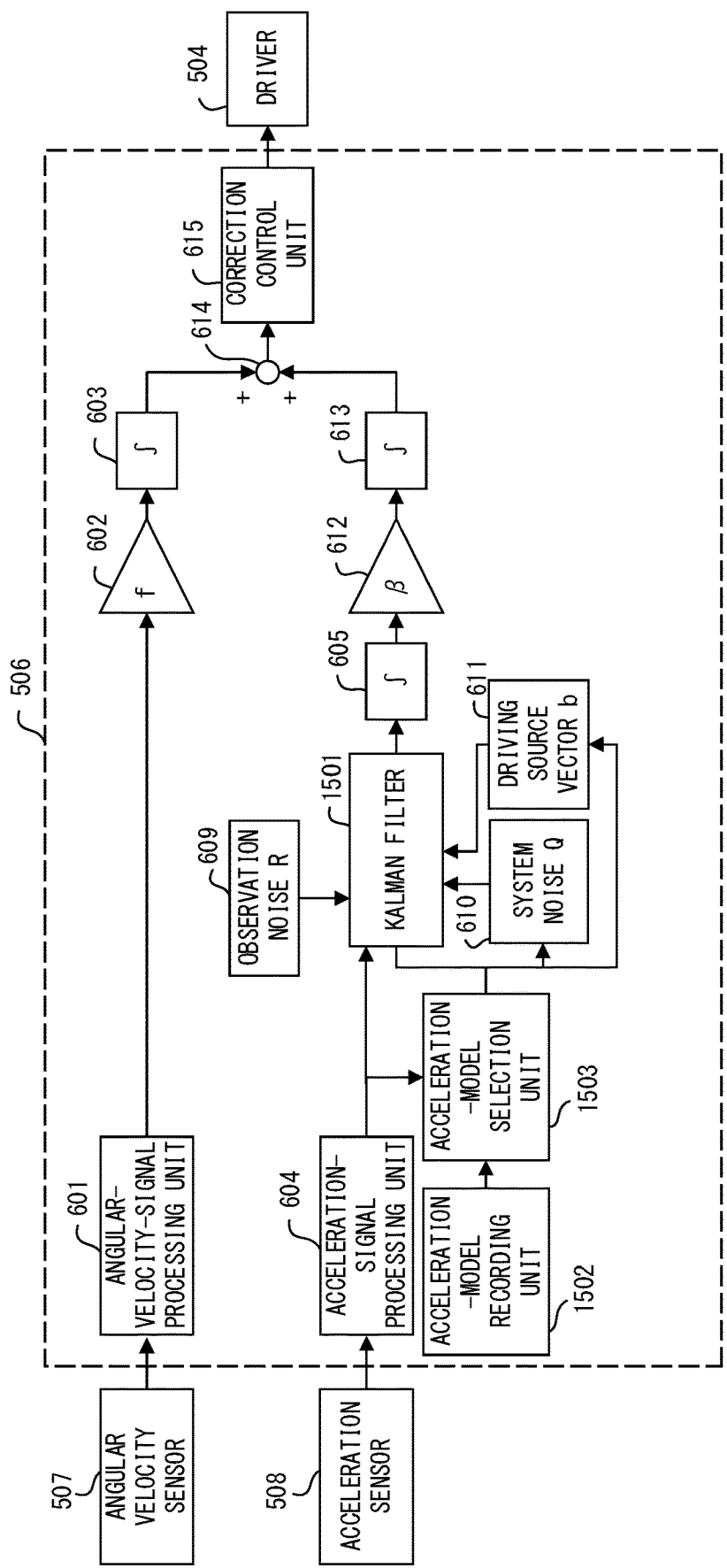
FIG. 15 illustrates the configuration of a blurring correction microcomputer in accordance with a fourth embodiment.

FIG. 15 illustrates the configuration of a blurring correction microcomputer 506 in accordance with the fourth embodiment.

The blurring correction microcomputer 506 depicted in FIG. 15 is such that a result of processing performed by an acceleration-signal processing unit 604 is input to a Kalman filter 1501. In comparison with the Kalman filter 606 in accordance with the first embodiment, the Kalman filter 1501 performs a filtering process on different objects and uses different models. Details of the Kalman filter 1501 will be described hereinafter by referring to FIG. 16.

The integrating filter 605 calculates a translational velocity by time-integrating a noise-component-removed translational acceleration output by the Kalman filter 1501.

The multiplication unit 612 multiplies the translational velocity calculated by the integrating filter 605 by an image shooting magnification β so as to calculate an image shifting amount resulting from translational blurring on the imaging plane.

Figure 16:
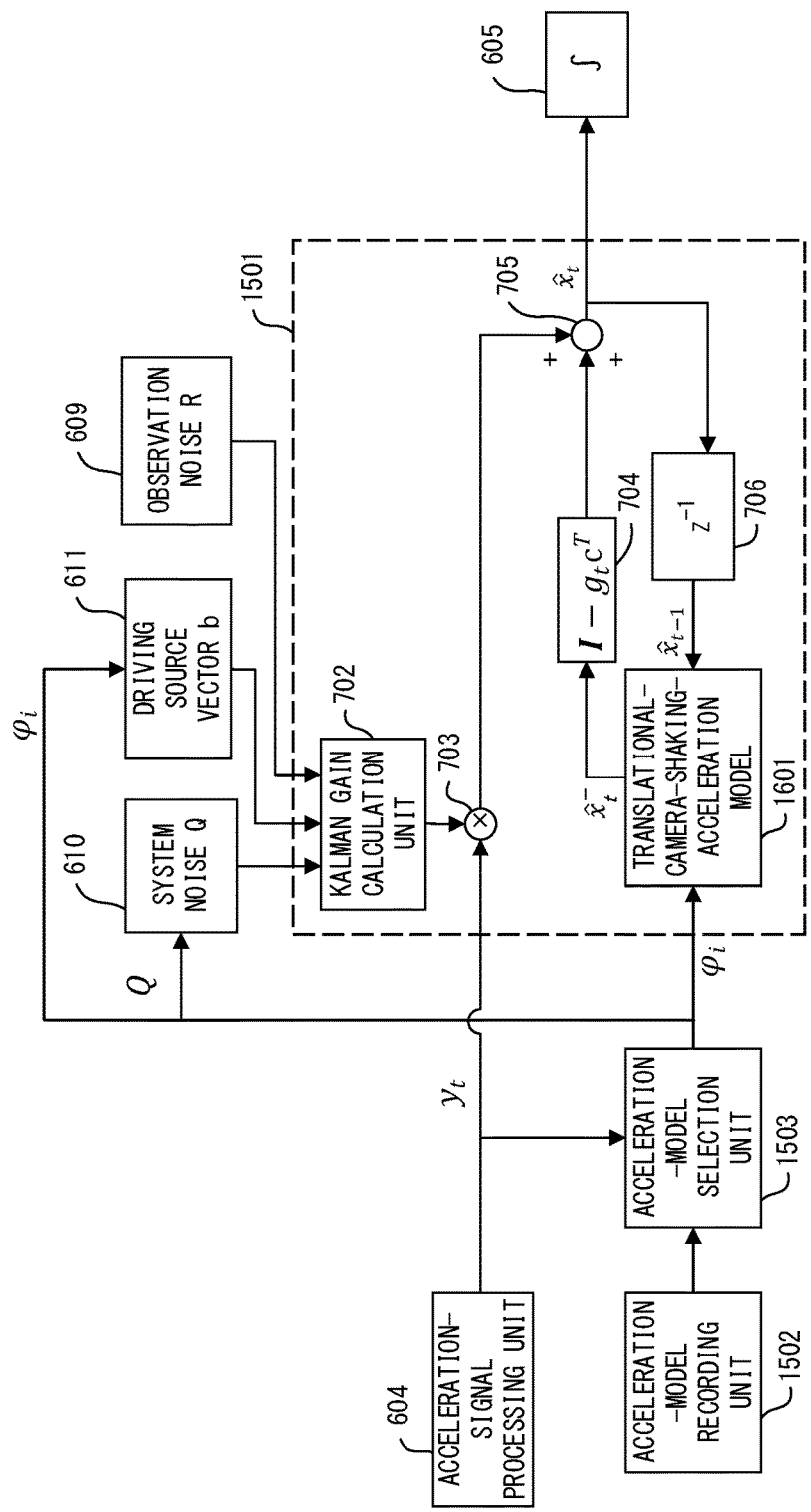
FIG. 16 illustrates the configuration of a Kalman filter in accordance with a fourth embodiment.

FIG. 16 illustrates the configuration of the Kalman filter 1501 in accordance with the fourth embodiment.

As indicated in FIG. 16, the Kalman filter 1501 in accordance with the fourth embodiment and the Kalman filter 606 in accordance with the first embodiment are different in that an acceleration is input to the Kalman filter 1501 and that the Kalman filter 1501 uses a translational-camera-shaking-acceleration model 1601 generated from time series data of a translational blurring acceleration resulting from translational blurring.

As with the velocity-model recording unit 607 in accordance with the first embodiment, models (auto-regressive coefficients φ and estimated errors Q of AR models) accommodating various cases are recorded in an acceleration-model recording unit 1502. For example, a model for accommodating an unstable posture of a photographer causing strong translational blurring, a model for accommodating a stable posture of a photographer causing weak translational blurring, and a model for accommodating a posture of an average photographer may be recorded. However, these models are created using time series data of translational accelerations resulting from translational blurring, unlike those in the first embodiment.

An acceleration model selection unit 1503 analyzes a translational acceleration that is a result of processing performed by the acceleration-signal processing unit 604 and selects a model in a closest frequency band from a plurality of models recorded in the acceleration-model recording unit 1502. Parameters that correspond to the selected model are designated for the translational-camera-shaking-acceleration model 1601, the system noise Q610, and the driving source vector b611, thereby allowing the Kalman filter 1501 to accurately remove noise from the acceleration.

As in the first embodiment, the Yule-Walker equation is used when creating a translational-camera-shaking-acceleration model (a model to be recorded in the acceleration-model recording unit 502) from time series data of a translational acceleration.

Time series data of a translational acceleration that is more accurate than one that would be obtained by the acceleration sensor 508 used for ordinary shake corrections will be required to create a translational-camera-shaking-acceleration model. For example, such time series data may be time series data of a translational acceleration obtained by an accelerometer mounted on the camera 501 and capable of obtaining accelerations for three axes X, Y, and Z more accurately than the acceleration sensor 508 or may be time series data of a translational blurring acceleration of a photographer that is obtained by the acceleration sensor 508 for an extended period so as to average and remove noise.

Fifth Embodiment

The following describes a fifth embodiment. The fifth embodiment is described herein by referring mainly to differences from the first embodiment. Like components in the fifth embodiment are given like reference marks to those in the first embodiment, and descriptions thereof are omitted herein.

Figure 17:
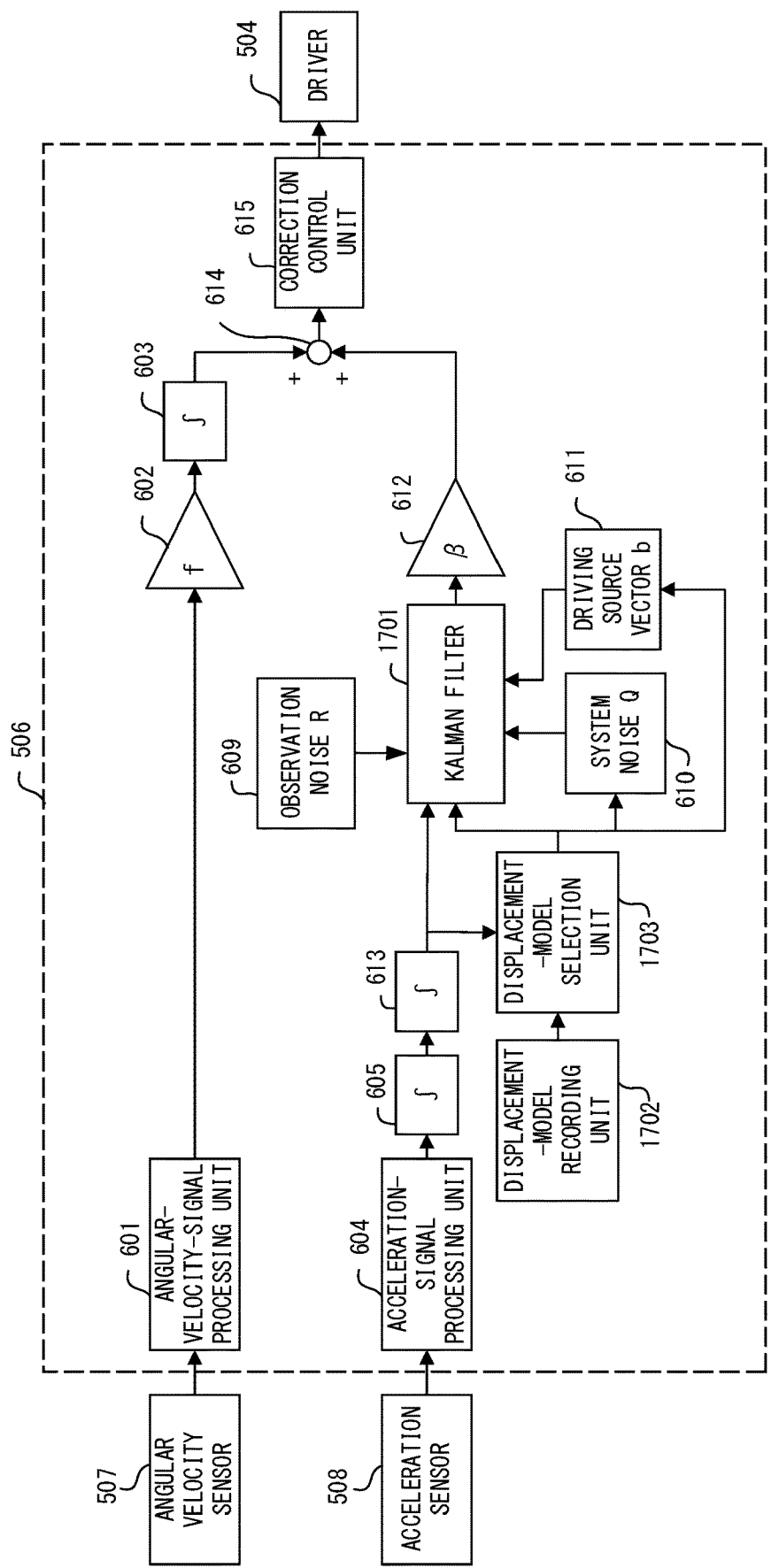
FIG. 17 illustrates the configuration of a blurring correction microcomputer in accordance with a fifth embodiment.

FIG. 17 illustrates the configuration of a blurring correction microcomputer 506 in accordance with the fifth embodiment.

The blurring correction microcomputer 506 depicted in FIG. 17 is such that output of the integrating filter 605 is input to the integrating filter 613. The integrating filter 613 time-integrates a translational velocity calculated by the integrating filter 605 so as to calculate the amount of translational shifting (translational displacement).

Output of the integrating filter 613 is input to a Kalman filter 1701. In comparison with the Kalman filter 606 in accordance with the first embodiment, the Kalman filter 1701 performs a filtering process on different objects and uses different models. Details of the Kalman filter 1701 will be described hereinafter by referring to FIG. 18.

Output of the Kalman filter 1701 is input to the multiplication unit 612. The multiplication unit 612 multiplies a noise-component-removed translational displacement (the amount of translational shifting) output by the Kalman filter 1701 by an image shooting magnification β so as to calculate the amount of translational-blurring image shifting.

Output of the multiplication unit 612 is input to the addition unit 614.

Figure 18:
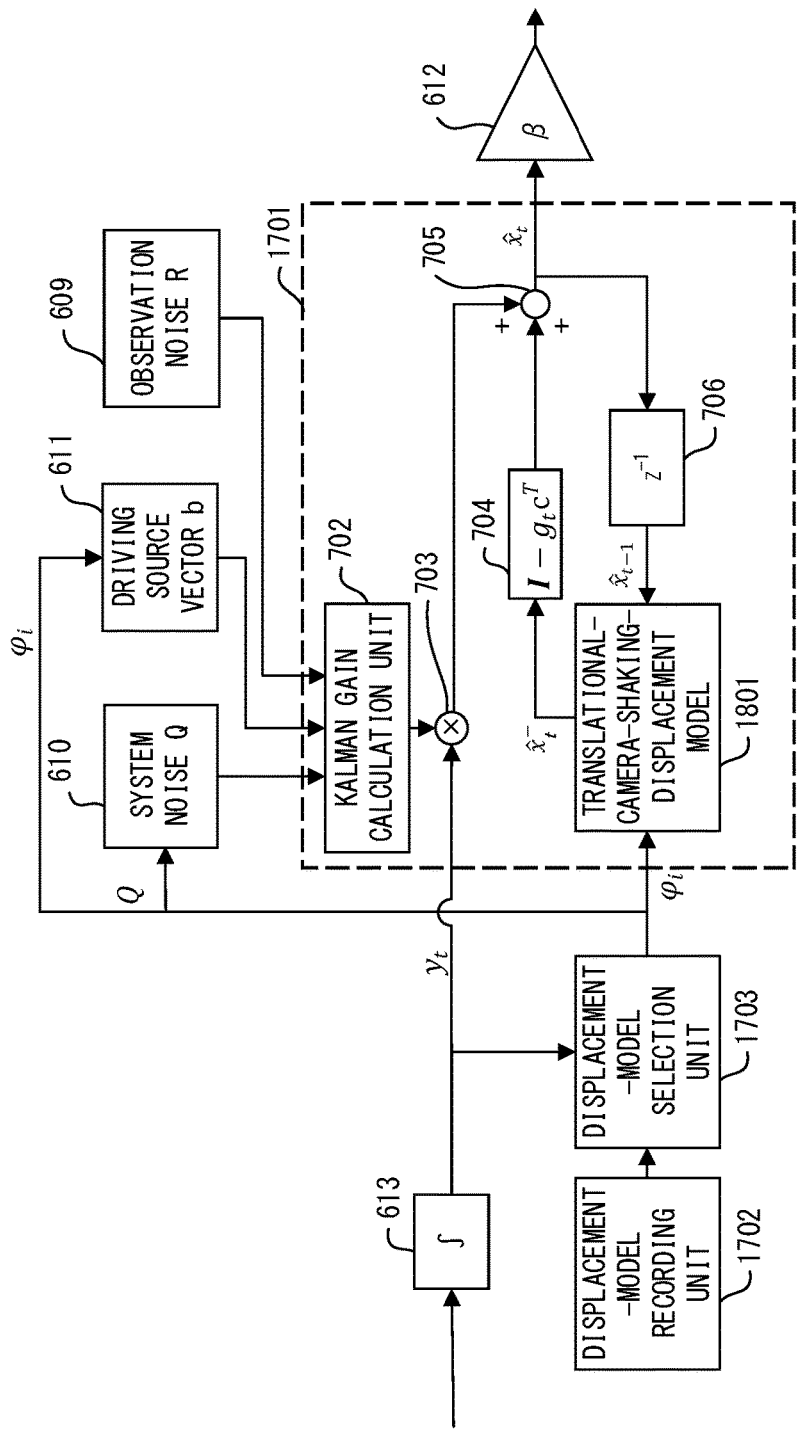
FIG. 18 illustrates the configuration of a Kalman filter in accordance with a fifth embodiment.

FIG. 18 illustrates the configuration of the Kalman filter 1701 in accordance with the fifth embodiment.

As indicated in FIG. 18, the Kalman filter 1701 in accordance with the fifth embodiment and the Kalman filter 606 in accordance with the first embodiment are different in that the amount of translational shifting is input to the Kalman filter 1701 and that the Kalman filter 1701 uses a translational-camera-shaking-displacement model 1801 generated from time series data of the amount of translational-blurring shifting resulting from translational blurring.

As with the velocity-model recording unit 607 in accordance with the first embodiment, models (auto-regressive coefficients φ and estimated errors Q of AR models) for accommodating various cases are recorded in a displacement-model recording unit 1702. For example, a model for accommodating an unstable posture of a photographer causing strong translational blurring, a model for accommodating a stable posture of a photographer causing weak translational blurring, and a model for accommodating a posture of an average photographer may be recorded. However, these models are created using time series data of translational displacements (the amounts of translational shifting) resulting from translational camera shaking, unlike those in the first embodiment.

A displacement-model selection unit 1703 analyzes a translational displacement that is a result of calculation performed by the integrating filter 613 and selects a model in a closest frequency band from a plurality of models recorded in the displacement-model recording unit 1702. Parameters that correspond to the selected model are designated for the translational-camera-shaking-displacement model 1801, the system noise Q610, and the driving source vector b611, thereby allowing the Kalman filter 1701 to accurately remove noise from the displacement (the amount of shifting).

Creating a model based on displacement (the amount of shifting) has the advantage of minimizing the model order owing to low-frequency-dominant data, resulting in a high likelihood of decreasing the amount of calculation.

In the fifth embodiment, sufficient accuracy can be ensured using a second-order model.

As in the first embodiment, the Yule-Walker equation is used when creating a translational-camera-shaking-displacement model (a model to be recorded in the displacement-model recording unit 1702) from time series data of translational displacement.

Time series data of translational displacement that is more accurate than data that would be obtained by integrating twice a result of detection provided by the acceleration sensor 508 used for ordinary shake corrections will be required to create a translational-camera-shaking-displacement model. For example, the time series data may be time series data of translational blurring displacement obtained by measuring camera displacement with a laser displacement meter when image shooting is performed with the camera held with the hand.

Sixth Embodiment

The following describes a sixth embodiment. The sixth embodiment is described herein by referring mainly to differences from the first embodiment. Like components in the sixth embodiment are given like reference marks to those in the first embodiment, and descriptions thereof are omitted herein.

Figure 19:
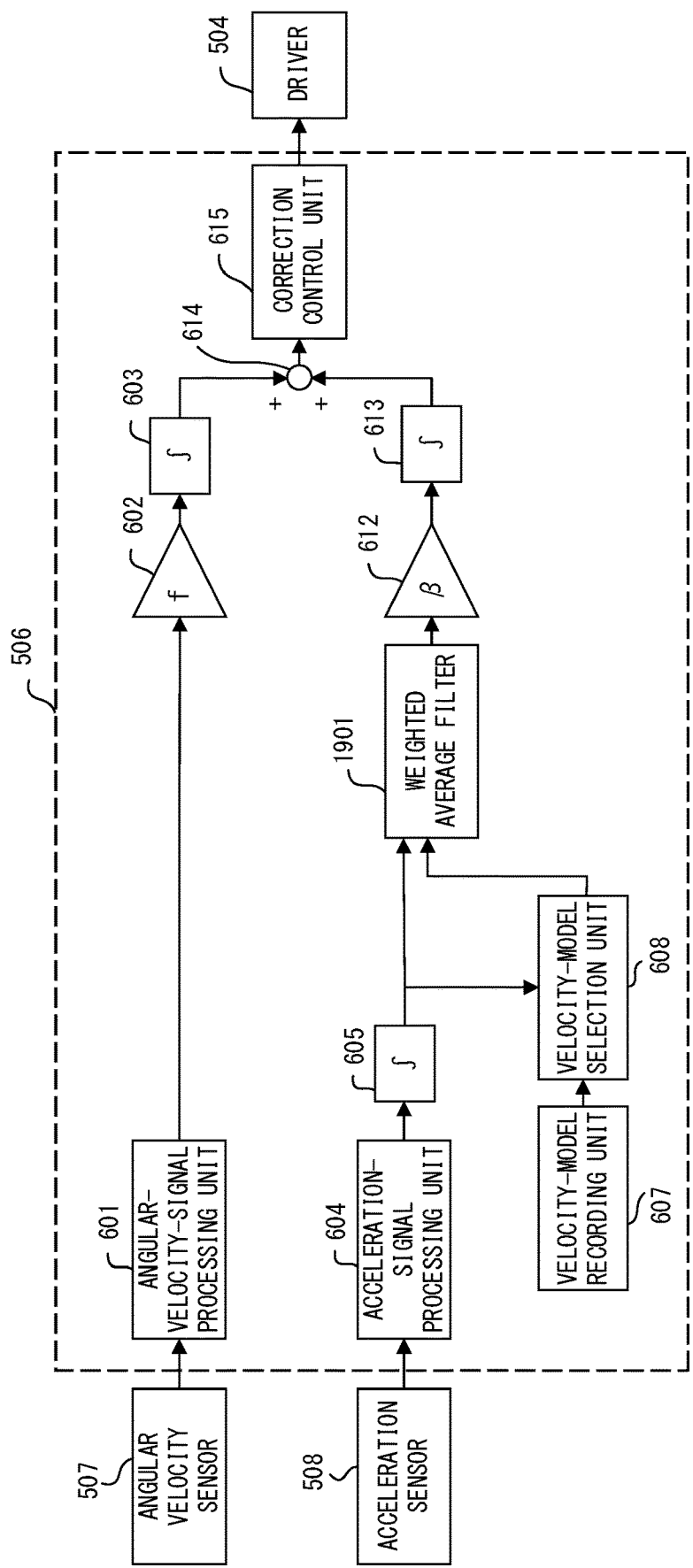
FIG. 19 illustrates the configuration of a blurring correction microcomputer in accordance with a sixth embodiment.

FIG. 19 illustrates the configuration of a blurring correction microcomputer 506 in accordance with the sixth embodiment.

As depicted in FIG. 19, the sixth embodiment is different from the first embodiment in that a weighted average filter 1901 is used instead of the Kalman filter 606.

Figure 20:
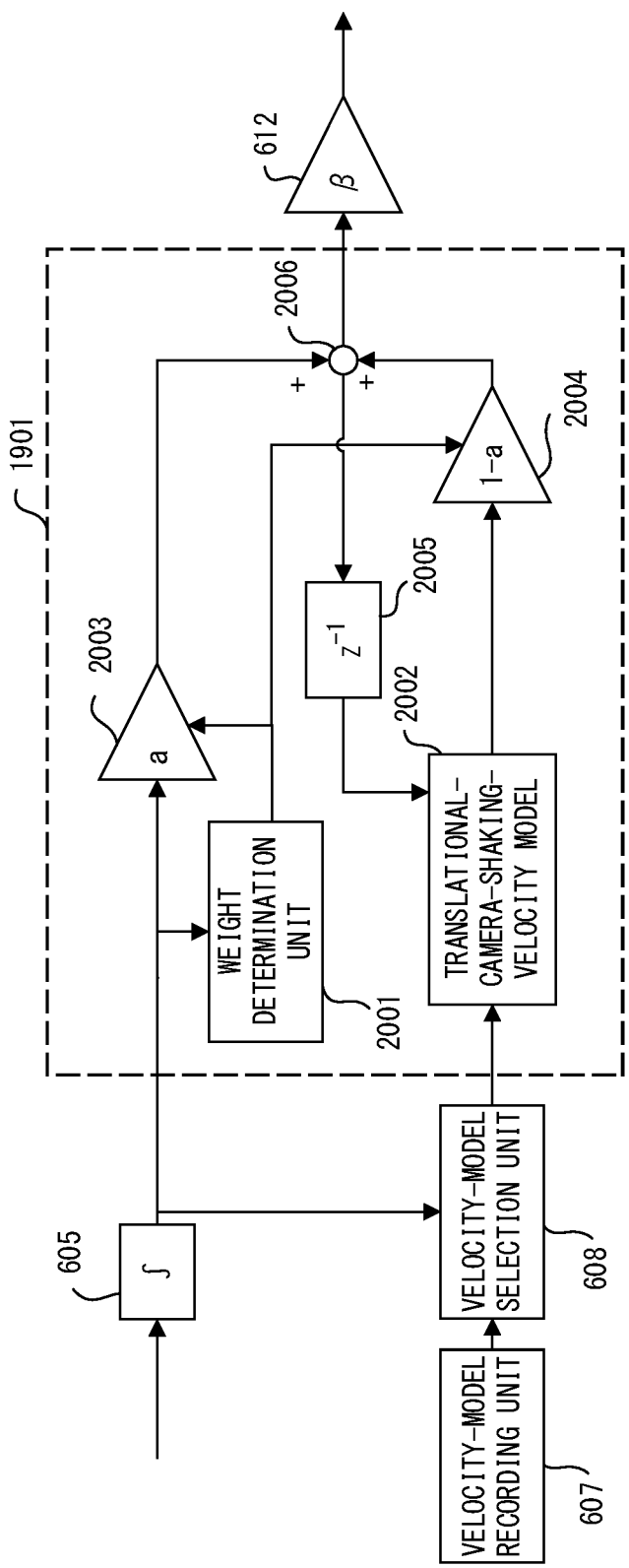
FIG. 20 illustrates the configuration of a weighted average filter in accordance with a sixth embodiment.

FIG. 20 illustrates the configuration of the weighted average filter 1901.

A weight determination unit 2001 of the weighted average filter 1901 depicted in FIG. 20 analyses characteristics of an input translational velocity (a result of calculation performed by the integrating filter 605) and sets, for weighting multiplication units 2003 and 2004, a weighting coefficient a for increasing a weight for a translational velocity that is an observation value when there is an increased difference between the analyzed characteristics and the characteristics of a model in use and for increasing a weight for the output of the translational-camera-shaking-velocity model 2002 as the difference between the analyzed characteristics and the characteristics of the model in use becomes smaller.

Accordingly, a predicted value may be used when accurate prediction can be implemented using a model, and output may be determined from an observation value when the prediction accuracy is low, thereby preventing malfunction.

The translational-camera-shaking-velocity model 2002, a delay operator $Z^{-1}$2005, and an addition unit 2006 correspond to the translational-camera-shaking-velocity model 701, the delay operator $Z^{-1}$706, and the addition unit 705 described above with reference to the first embodiment.

In comparison with the Kalman filter 606 used in the first embodiment (and the Kalman filters used in the second to fifth embodiments), the weighted average filter 1901 used in the sixth embodiment performs a small amount of calculation and thus can perform high-speed processing. Hence, the weighted average filter 1901 has the advantage of high implementability even if the performance of the operation of the blurring correction microcomputer 506 is low.

The embodiments described so far can be varied or combined in various manners.

For example, the fourth or fifth embodiment may be provided with a dedicated-for-creation-of-model mode similar to the dedicated-for-creation-of-translational-camera-shaking-velo city-model mode described above with reference to the second embodiment or may be modified such that a model can be created during live view as described above with reference to the third embodiment. For example, the first and third embodiments may be combined to use an appropriate model according to the circumstances. In addition, for example, the second to fifth embodiments may be modified to use a weighted average filter instead of the Kalman filter, as in the sixth embodiment. Components of different embodiments may be combined as appropriate. For example, some of the components indicated with reference to embodiments may be omitted.

The embodiments described herein provide the advantage of increasing the shake correction performance by achieving a filtering process with fewer characteristic losses than the conventional filters by modeling a person's translational camera shaking characteristics and using model-based estimate values.

What is claimed is:

1. An image blurring correction apparatus comprising:
   an optical system that forms a subject image on an image formation plane;
   an acceleration sensor that detects an acceleration of an apparatus that has the image formation plane;
   a first calculation circuit that calculates a first state quantity by using the acceleration;
   a second calculation circuit that calculates, as a second state quantity, an estimate value obtained by estimating a true value of the first state quantity by using the first state quantity and a model;
   a third calculation circuit that calculates an amount of image blurring on the image formation plane by using the second state quantity; and
   a memory that records an estimation parameter as the model, the estimation parameter includes a plurality of auto-regressive coefficients calculated from a plurality of the first state quantities.

2. The image blurring correction apparatus of claim 1, further comprising:

a selection circuit that selects the model to be used by the second calculation circuit from a plurality of models recorded by the memory.

3. The image blurring correction apparatus of claim 1, wherein
the second calculation circuit is a Kalman filter or a weighted average filter.

4. The image blurring correction apparatus of claim 1, wherein
the first state quantity is a velocity, and
the second state quantity is an estimate value obtained by estimating a true value of the velocity.

5. The image blurring correction apparatus of claim 1, wherein
the first state quantity is the acceleration with predetermined signal processing applied thereto, and
the second state quantity is an estimate value obtained by estimating a true value of the acceleration after the predetermined signal processing.

6. The image blurring correction apparatus of claim 1, wherein
the first state quantity is a displacement, and
the second state quantity is an estimate value obtained by estimating a true value of the displacement.

7. The image blurring correction apparatus of claim 1, wherein
the plurality of auto-regressive coefficients are calculated and recorded in the memory in a process of producing the image blurring correction apparatus.

8. The image blurring correction apparatus of claim 1, wherein
the plurality of auto-regressive coefficients are calculated when a predetermined operation mode is set for the image blurring correction apparatus.

9. The image blurring correction apparatus of claim 1, wherein
the apparatus that has the image formation plane is an image capturing apparatus, and
the plurality of auto-regressive coefficients are calculated during a standby time in image shooting performed by the image capturing apparatus.

10. The image blurring correction apparatus of claim 1, wherein
the image formation plane is an imaging plane of an image pickup element, and
the image blurring correction apparatus further comprises:
a drive mechanism that moves the image pickup element or a portion of the optical system in a direction perpendicular to an optical axis; and
a control circuit that operates the drive mechanism on the basis of the amount of image blurring.

11. An image blurring correction method comprising:
forming a subject image on an image formation plane;
detecting an acceleration of an apparatus that has the image formation plane;
calculating a first state quantity by using the acceleration;
calculating, as a second state quantity, an estimate value obtained by estimating a true value of the first state quantity by using the first state quantity and a model;
calculating an amount of image blurring on the image formation plane by using the second state quantity; and
recording an estimation parameter as the model, the estimation parameter including a plurality of auto-regressive coefficients calculated from a plurality of the first state quantities.

12. A non-transitory recording medium having recorded therein an image blurring correction program to be executed by a computer, the image blurring correction program causing the computer to perform a process comprising:
forming a subject image on an image formation plane;
detecting an acceleration of an apparatus that has the image formation plane;
calculating a first state quantity by using the acceleration;
calculating, as a second state quantity, an estimate value obtained by estimating a true value of the first state quantity by using the first state quantity and a model;
calculating an amount of image blurring on the image formation plane by using the second state quantity; and
recording an estimation parameter as the model, the estimation parameter including a plurality of auto-regressive coefficients calculated from a plurality of the first state quantities.

* * * * *